US012803624B2

(12) United States Patent
Athley et al.

(10) Patent No.: US 12,803,624 B2
(45) Date of Patent: Nov. 17, 2026

(54) INDICATION OF NON-ZERO COEFFICIENTS IN REL-18 TYPE II CODEBOOK FOR HIGH VELOCITY

(71) Applicant: Telefonaktiebolaget LM Ericsson (publ), Stockholm (SE)

(72) Inventors: Fredrik Athley, Västra Frölunda (SE); Xinlin Zhang, Västra Frölunda (SE); Johan Winges, Mölndal (SE); Keerthi Kumar Nagalapur, Gothenburg (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 19/110,081

(22) PCT Filed: Sep. 8, 2023

(86) PCT No.: PCT/SE2023/050887

§ 371 (c)(1),
(2) Date: Mar. 9, 2025

(87) PCT Pub. No.: WO2024/063682

PCT Pub. Date: Mar. 28, 2024

(65) Prior Publication Data

US 2026/0081649 A1 Mar. 19, 2026

Related U.S. Application Data

(60) Provisional application No. 63/409,425, filed on Sep. 23, 2022.

(51) Int. Cl.
*H04B 7/0456* (2017.01)
*H04W 24/10* (2009.01)

(52) U.S. Cl.
CPC .......... *H04B 7/0456* (2013.01); *H04W 24/10* (2013.01)

(58) Field of Classification Search
CPC .. H04B 7/0456; H04B 7/0645; H04B 7/0481; H04B 7/048; H04B 7/0626; H04B 7/0639; H04B 7/0663; H04B 7/0478
See application file for complete search history.

(56) References Cited

U.S. PATENT DOCUMENTS

2022/0077911 A1* 3/2022 Sergeev ............... H04B 7/0626
2024/0155406 A1* 5/2024 Zou ...................... H04B 7/0639
(Continued)

FOREIGN PATENT DOCUMENTS

EP 3780410 A1 2/2021
WO 2022144778 A1 7/2022

OTHER PUBLICATIONS

R1-2205983, Discussion on CSI enhancement for high/medium UE velocities and coherent JT, 3GPP TSG RAN WG1 #110, Spreadtrum Communications, Toulouse, France, Aug. 22-26, 2022 (Year: 2022).*
(Continued)

*Primary Examiner* — Aristocratis Fotakis
(74) *Attorney, Agent, or Firm* — Withrow & Terranova, PLLC

(57) ABSTRACT

Systems and methods for indication of Non-Zero Coefficients (NZCs) in a codebook for User Equipments (UEs) are disclosed. In one embodiment, a method performed by a UE comprises generating Channel State Information (CSI) comprising NZCs of a set of linear combining coefficients, wherein the set of linear combining coefficients are associated with a number, L, of selected Discrete Fourier Transform (DFT) basis vectors in spatial domain (SD), a number, M, of selected DFT basis vectors in frequency domain (FD), and $$M_v^{DD}$$

selected DFT basis vectors in Doppler Domain (DD). The CSI further comprises, for each reported layer, a set of $$M_v^{DD}$$

(Continued)

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD. The method further comprises reporting the CSI to a network node.

14 Claims, 15 Drawing Sheets

(56) References Cited

U.S. PATENT DOCUMENTS

| | | | | |
|---|---|---|---|---|
| 2025/0392362 | A1* | 12/2025 | Gao | H04B 7/048 |
| 2026/0052415 | A1* | 2/2026 | Shibaike | H04W 24/10 |
| 2026/0058698 | A1* | 2/2026 | Yang | H04B 7/0456 |

OTHER PUBLICATIONS

R1-2206026, Discussion on CSI enhancement for high/medium UE velocities and coherent JT, 3GPP TSG RAN WG1 #110, vivo, Toulouse, France, Aug. 22-26, 2022 (Year: 2022).*
R1-2206265, CSI enhancement for high/medium UE velocities and coherent JT, 3GPP TSG RAN WG1 #110, OPPO, Toulouse, France, Aug. 22-26, 2022 (Year: 2022).*
R1-2205016, CSI enhancements for high/medium UE velocities and Coherent—JT, 3GPP TSG RAN WG1 #109-e, Qualcomm Incorporated, e-Meeting, May 9-20, 2022 (Year: 2022).*
Author Unknown, "Technical Specification Group Radio Access Network; NR; Physical layer procedures for data (Release 17)," Technical Specification 38.214, Version 17.2.0, Jun. 2022, 3GPP Organizational Partners, 228 pages.
Author Unknown, "RAN1 Chair's Notes," 3GPP TSG RAN WG1 #110, Aug. 22-26, 2022, Toulouse, France, 47 pages.
CATT, "R1-2104488: CSI Enhancements for Rel-17," 3GPP TSG RAN WG1 Meeting #105-e, May 19-27, 2021, Electronic Meeting, 19 pages.
Nokia, "R1-2306330: Introduction of specification support for MIMO enhancements on CSI," 3GPP TSG-RAN WG1 Meeting #113, Incheon, Korea, May 22-26, 2023, 51 pages.
Samsung, "RP-213598: New WID: MIMO Evolution for Downlink and Uplink," 3GPP TSG RAN Meeting #94e, Dec. 6-17, 2021, Electronic Meeting, 6 pages.
ZTE, "R1-2205920: CSI enhancement for high/medium UE velocities and CJT," 3GPP TSG RAN WG1 Meeting #110, Aug. 22-26, 2022, Toulose, France, 24 pages.
Invitation to Pay Additional Fees and Partial Search for International Patent Application No. PCT/SE2023/050887, mailed Dec. 13, 2023, 11 pages.
International Search Report and Written Opinion for International Patent Application No. PCT/SE2023/050887, mailed Mar. 19, 2024, 19 pages.

* cited by examiner $$i_1 = \begin{cases} [i_{1,1} \; i_{1,2} \; i_{1,5} \; i_{1,6,1} \; i_{1,7,1} \; i_{1,8,1} \; i_{1,9,1}] & v = 1 \\ [i_{1,1} \; i_{1,2} \; i_{1,5} \; i_{1,6,1} \; i_{1,7,1} \; i_{1,8,1} \; i_{1,9,1} \; i_{1,6,2} \; i_{1,7,2} \; i_{1,8,2} \; i_{1,9,2}] & v = 2 \\ [i_{1,1} \; i_{1,2} \; i_{1,5} \; i_{1,6,1} \; i_{1,7,1} \; i_{1,8,1} \; i_{1,9,1} \; i_{1,6,2} \; i_{1,7,2} \; i_{1,8,2} \; i_{1,9,2} \; i_{1,6,3} \; i_{1,7,3} \; i_{1,8,3} \; i_{1,9,3}] & v = 3 \\ [i_{1,1} \; i_{1,2} \; i_{1,5} \; i_{1,6,1} \; i_{1,7,1} \; i_{1,8,1} \; i_{1,9,1} \; i_{1,6,2} \; i_{1,7,2} \; i_{1,8,2} \; i_{1,9,2} \; i_{1,6,3} \; i_{1,7,3} \; i_{1,8,3} \; i_{1,9,3} \; i_{1,6,4} \; i_{1,7,4} \; i_{1,8,4} \; i_{1,9,4}] & v = 4 \end{cases}$$

$$i_2 = \begin{cases} [i_{2,3,1} \; i_{2,4,1} \; i_{2,5,1}] & v = 1 \\ [i_{2,3,1} \; i_{2,4,1} \; i_{2,5,1} \; i_{2,3,2} \; i_{2,4,2} \; i_{2,5,2}] & v = 2 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3}] & v = 3 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \; i_{2,3,4} \; i_{2,4,4} \; i_{2,5,4}] & v = 4 \end{cases}$$

FIG. 7

INDICATION OF NON-ZERO COEFFICIENTS IN REL-18 TYPE II CODEBOOK FOR HIGH VELOCITY

RELATED APPLICATIONS

This application is a 35 U.S.C. § 371 national phase filing of International Application No. PCT/SE2023/050887, filed Sep. 8, 2023, which claims the benefit of provisional patent application Ser. No. 63/409,425, filed Sep. 23, 2022, the disclosures of which are hereby incorporated herein by reference in their entireties.

TECHNICAL FIELD

The present disclosure relates to Channel State Information (CSI) feedback in a cellular communications system.

BACKGROUND

Codebook-Based Precoding

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

The 3rd Generation Partnership Project (3GPP) New Radio (NR) standard is currently evolving with enhanced MIMO support. A core component in NR is the support of MIMO antenna deployments and MIMO related techniques like, for instance, spatial multiplexing. The spatial multiplexing mode is aimed for high data rates in favorable channel conditions. An illustration of the spatial multiplexing operation in NR is provided in FIG. 1.

As seen in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer, and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

NR uses Orthogonal Frequency Division Multiplexing (OFDM) in the downlink (and Discrete Fourier Transform (DFT) precoded OFDM in the uplink for rank-1 transmission) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R x N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the User Equipment (UE).

In closed-loop precoding for the $N_R$ downlink, the UE transmits, based on channel measurements in the downlink, recommendations to the next generation Node B (gNB) of a suitable precoder to use. The gNB configures the UE to provide feedback according to CSI-ReportConfig and may transmit Channel State Information Reference Signal (CSI-RS) and configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report, e.g., several precoders, one per subband. This is an example of the more general case of Channel State Information (CSI) feedback, which also encompasses feeding back other information than recommended precoders to assist the gNB in subsequent transmissions to the UE. Such other information may include Channel Quality Indicators (CQIs) as well as transmission Rank Indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 Physical Resource Blocks (PRBs) depending on the band width part (BWP) size.

Given the CSI feedback from the UE, the gNB determines the transmission parameters it wishes to use to transmit to the UE, including the precoding matrix, transmission rank, and Modulation and Coding Scheme (MCS). These transmission parameters may differ from the recommendations the UE makes. The transmission rank, and thus the number of spatially multiplexed layers, is reflected in the number of columns of the precoder W. For efficient performance, it is important that a transmission rank that matches the channel properties is selected.

With Multi-User MIMO (MU-MIMO), two or more users in the same cell are co-scheduled on the same time-frequency resource(s). That is, two or more independent data streams are transmitted to different UEs at the same time, and the spatial domain can typically be used to separate the respective streams. By transmitting several streams simultaneously, the capacity of the system can be increased. This, however, comes at the cost of reducing the Signal to Interference plus Noise Ratio (SINR) per stream, as the power must be shared between streams, and the streams will cause interference to each other.

Channel State Information Reference Signals (CSI-RS)

For CSI measurement and feedback, CSI-RS are defined. A CSI-RS is transmitted on each antenna port and is used by a UE to measure downlink channel between each of the transmit antenna ports and each of its receive antenna ports. The transmit antenna ports are also referred to as CSI-RS ports. The supported number of antenna ports in NR are {1, 2, 4, 8, 12, 16, 24, 32}. By measuring the received CSI-RS, a UE can estimate the channel that the CSI-RS is traversing, including the radio propagation channel and antenna gains.

The CSI-RS for the above purpose is also referred to as Non-Zero Power (NZP) CSI-RS.

CSI-RS can be configured to be transmitted in certain Resource Elements (REs) in a slot and certain slots. FIG. 2 shows an example of CSI-RS REs for 12 antenna ports, where 1 RE per Resource Block (RB) per port is shown.

In addition, Interference Measurement Resource (IMR) is also defined in NR for a UE to measure interference. An IMR resource contains 4 REs, either 4 adjacent REs in frequency in the same OFDM symbol or 2-by-2 adjacent REs in both time and frequency in a slot. By measuring both the channel based on NZP CSI-RS and the interference based on an IMR, a UE can estimate the effective channel and noise plus interference to determine the CSI, i.e. rank, precoding matrix, and the channel quality.

Furthermore, a UE in NR may be configured to measure interference based on one or multiple NZP CSI-RS resource.

CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report.

Each CSI reporting setting contains at least the following information:

- A CSI-RS resource set for channel measurement
- Optionally, a CSI-RS resource set for interference measurement
- Time-domain behavior, i.e. periodic, semi-persistent, or aperiodic reporting
- Frequency granularity, i.e. wideband or subband
- CSI parameters to be reported such as RI, PMI, CQI, and CSI-RS resource indicator (CRI) in case of multiple CSI-RS resources in a resource set
- Codebook types, i.e. type I or II, and codebook subset restriction
- Measurement restriction
- Subband size. One out of two possible subband sizes is indicated, the value range depends on the bandwidth of the bandwidth part (BWP). One CQI/PMI (if configured for subband reporting) is fed back per subband).

When the CSI-RS resource set in a CSI reporting setting contains multiple CSI-RS resources, one of the CSI-RS resources is selected by a UE and a CSI-RS resource indicator (CRI) is also reported by the UE to indicate to the gNB about the selected CSI-RS resource in the resource set, together with RI, PMI, and CQI associated with the selected CSI-RS resource.

For aperiodic CSI reporting in NR, more than one CSI reporting settings, each with a different CSI-RS resource set for channel measurement and/or resource set for interference measurement, can be configured and triggered at the same time. In this case, multiple CSI reports are aggregated and sent from the UE to the gNB in a single Physical Uplink Shared Channel (PUSCH).

Type I and Type II Codebooks in NR

Type I codebook (CB) is typically used by a UE to report CSI for single user MIMO (SU-MIMO) scheduling in NR, while Type II CB is typically for more accurate CSI feedback for Multi-User MIMO (MU-MIMO) scheduling.

For both Type I and Type II CBs, for each rank, a precoding matrix W is defined in the form of $$W = W_1 W_2$$

where $$W_1 = \begin{bmatrix} d_1 & d_2 & \dots & d_L & 0 & 0 & \dots & 0 \\ 0 & 0 & \dots & 0 & d_1 & d_2 & \dots & d_L \end{bmatrix}$$

is a 2N×2L matrix and contains information of L selected DFT beams $\{d_i, i=1, \ldots, L\}$, where $d_i$ is a Nx1 DFT vector and N is the number of CSI-RS ports per polarization. $\tilde{W}_2$ is a 2L×v matrix and contains the co-phasing coefficients between the selected beams and also between antenna ports with two different polarizations, where v is the number of layers or rank. $\tilde{W}_1$ is the same for the whole CSI bandwidth while $\tilde{W}_2$ can be for the whole bandwidth or per subband.

In case of Type I CB, the precoding vector for each MIMO layer is associated with a single DFT beam. While for Type II CB, the precoding vector for each layer is a linear combination of multiple DFT beams.

Enhanced Type II Codebook in NR

In NR Rel-16, the Type II codebook is enhanced by applying Frequency Domain (FD) compression across all subbands to reduced CSI feedback overhead and/or improve CSI accuracy. Instead of reporting $\tilde{W}_2$ for each subband, linear combinations of DFT basis vectors are used to jointly represent $\tilde{W}_2$ across the whole CSI bandwidth. For each layer, a precoding matrix W across all subbands is in the form $$W = W_1 \tilde{W}_2' W_f^H$$

where $\tilde{W}_f=[f_1, \ldots, f_M]$ is a matrix containing M selected DFT basis vectors $\{f_1, \ldots, f_M\}$, and $\tilde{W}'_2$ is 2L×M matrix containing the coefficients for each selected DFT beam and each selected FD basis vector.

In order to save reporting overhead and since some coefficients in $\tilde{W}'_2$ typically are weak, only a subset of $K_{NZ,i} \le K_0 < 2LM_i$ Non-Zero Coefficients (NZC) are reported for each layer i. The $2LM_i - K_{NZ,i}$ non-reported coefficients are assumed to be zero. The maximum number of non-zero coefficients per layer is $K_0 = \lceil \beta \times 2LM_0 \rceil$ where $\beta \in \{1/4, 1/2, 3/4\}$ is configured via Radio Resource Control (RRC) signaling. For RI={2, 3, 4}, where RI is the rank indicator, the total maximum number of NZCs across all layers is $\le 2K_0$. In order for the gNB to know which coefficients in $\tilde{W}'_2$ have been selected, a bitmap of size $2LM_i$ for each layer i is used to indicate the NZC for that layer.

Enhanced Type II Codebook for High/Medium UE Velocities

It has been observed in measurements in real deployments that downlink MU-MIMO precoding performance degrades when one or more of the co-scheduled UEs start to move faster than a few kilometers per hour (km/h) relative to the base station. One of the main reasons is that the information of the channels, used to compute the MIMO precoding at the base station, becomes outdated rather quickly when this occurs. As a result, the precoder loses its effectiveness to protect co-scheduled UEs from interference when transmitting to an intended UE. Hence, downlink MU-MIMO precoding needs to be made robust to higher UE speeds.

One solution to mitigate this problem and to cope with such rapid channel variations is to configure faster CSI reporting (i.e., more frequent CSI reporting and measurement). A problem with this approach is that this incurs a large signaling and reporting overhead. Furthermore, even if the CSI-RS periodicity is increased, there is still a CSI reporting and scheduling delay that may cause the reported CSI to become outdated. Hence, with the current CSI framework in NR, it is difficult to obtain accurate CSI for medium-to-high-speed UEs with a reasonable amount of overhead.

It has been agreed in the 3GPP Release 18 work item on MIMO Evolution for Downlink and Uplink (see 3GPP RP-213598, New WID: MIMO Evolution for Downlink and Uplink) to specify CSI reporting enhancement for high/medium UE velocities by exploiting time-domain correlation/Doppler-domain information to assist downlink precoding. In particular, Rel-16/17 Type-II codebook refinement, without modification to the spatial and frequency domain basis should be investigated.

The following agreement regarding the new Type II codebook structure for high/medium UE velocities was made in RAN1 #110 (see RAN1 Chair's Notes, 3GPP TSG RAN WG1 #110, Toulouse, France, Aug. 22-26, 2022):

For the Rel-18 Type-II codebook refinement for high/medium velocities, down-select one from the following codebooks structures:
- Alt2A: Doppler-domain basis commonly selected for all SD/FD bases, e.g. $\tilde{W}_1\tilde{W}_2(\tilde{W}_f \otimes \tilde{W}_d)^H$
  - Note that $\tilde{W}_d$ may be the identity as a special case
- Alt2B: Doppler-domain basis independently selected for different SD/FD bases
  - Note that $\tilde{W}_d$ may be the identity as a special case
- Alt3. Reuse Rel-16/17 (F)eType-II codebook with multiple $\tilde{W}_2$ and a single $\tilde{W}_1$ and $\tilde{W}_f$ report.

SUMMARY

Systems and methods for indication of Non-Zero Coefficients (NZCs) in a codebook for high velocity User Equipments (UEs) are disclosed. In one embodiment, a method performed by a UE comprises generating Channel State Information (CSI) comprising NZCs of a set of linear combining coefficients, wherein the set of linear combining coefficients are associated with a number, L, of selected Discrete Fourier Transform (DFT) basis vectors in spatial domain (SD), a number, M, of selected DFT basis vectors in frequency domain (FD), and $$M_v^{DD}$$

selected DFT basis vectors in Doppler Domain (DD). The CSI further comprises, for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD. The method further comprises reporting the CSI to a network node. In this manner, indication of the NZCs is enabled (e.g., for high/medium UE velocities) with low overhead while still capturing the significant channel information.

In one embodiment, each NZC bitmap of the set of $$M_v^{DD}$$

NZC bitmaps has a size of 2LM bits.

In one embodiment, a maximum number of NZCs per layer is determined, configured, or defined by a total number of NZCs for all $$M_v^{DD}$$

selected DFT basis vectors in DD.

In one embodiment, a maximum number of NZCs per layer is determined, configured, or defined per selected DFT basis vector in DD.

In one embodiment, the CSI further comprises, for each reported layer, a single strongest coefficient indicator that indicates a position of a strongest coefficient for that layer. In one embodiment, the single strongest coefficient indicator is associated with any selected DFT basis vector in SD, DFT basis vector in FD, and DFT basis vector in DD that are reported together with the NZCs of the set of linear combining coefficients. In another embodiment, the single strongest coefficient indicator is associated with any selected DFT basis vector in SD and DFT basis vector in DD that are reported together with the NZCs of the set of linear combining coefficients and is associated with a DC component of DFT basis vector in FD. In another embodiment, the single strongest coefficient indicator is associated with any selected DFT basis vector in SD and DFT basis vector in FD that are reported together with the NZCs of the set of linear combining coefficients, and is associated with a DC component of DFT basis vector in DD. In another embodiment, the single strongest coefficient indicator is associated with any selected DFT basis vector in SD that is reported together with the NZCs of the set of linear combining coefficients, and is associated with a DC component of the DFT basis vector in FD as well as a DC component of the DFT basis vector in DD.

In one embodiment, the CSI further comprises an indication of the selected DFT basis vectors in DD.

In one embodiment, each of the set of linear combination coefficients is represented by a set of amplitude coefficient indicators and a set of phase coefficient indicators.

Corresponding embodiments of a UE are also disclosed. In one embodiment, a UE is adapted to generate CSI comprising NZCs of a set of linear combining coefficients, wherein the set of linear combining coefficients are associated with a number, L, of selected DFT basis vectors in SD, a number, M, of selected DFT basis vectors in FD, and $$M_v^{DD}$$

selected DFT basis vectors in DD. The CSI further comprises, for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD. The UE is further adapted to report the CSI to a network node.

In one embodiment, a UE comprises a communication interface and processing circuitry associated with the communication interface. The processing circuitry is configured to cause the UE to generate CSI comprising NZCs of a set of linear combining coefficients, wherein the set of linear combining coefficients are associated with a number, L, of selected DFT basis vectors in SD, a number, M, of selected DFT basis vectors in FD, and $$M_v^{DD}$$

selected DFT basis vectors in DD. The CSI further comprises, for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected basis vectors in DD. The processing circuitry is further configured to cause the UE to report the CSI to a network node.

In another embodiment, a method performed by a UE comprises generating CSI comprising NZCs of a plurality of linear combining coefficient matrices ($\tilde{W}_2$s) for a plurality of time instances, respectively, and at least one NZC bitmap that indicates positions of the NZCs in the plurality of $\tilde{W}_2$s for the plurality of time instances. The at least one NZC bitmap comprises either a common NZC bitmap for all of the plurality of time instances per each reported layer, or a common NZC bitmap for all of the plurality of times for all reported layers, or a first common NZC bitmap for all of the plurality of time instances for a first set of reported layers and separate NZC bitmaps for all of the plurality of time instances for a second set of report layers, or two or more common NZC bitmaps for two or more sets of reported layers, respectively. The method further comprises reporting the CSI to a network node.

In one embodiment, generating the at least one NZC bitmap comprises generating at least one common NZC bitmap for all of the plurality of time instances based on only one of the plurality of $\tilde{W}_2$s for the plurality of time instances.

In one embodiment, generating the at least one NZC bitmap comprises generating at least one common NZC bitmap for all of the plurality of time instances based on only a subset of the plurality of $\tilde{W}_2$s for the plurality of time instances.

In one embodiment, the CSI further comprises, for each of the reported layers, a single strongest coefficient indicator that indicates a position of a strongest coefficient for all of the plurality of linear combining coefficient matrices ($\tilde{W}_2$s) for the plurality of time instances for that layer.

In one embodiment, for each reported layer, the elements of each of the plurality of linear combining coefficient matrices ($\tilde{W}_2$ s) for the plurality of time instances are normalized with respect to a strongest coefficient of that layer such that, after normalization, strongest coefficient has unit amplitude and zero phase and, as such, is not reported. The CSI further comprises, for each of the reported layers, a single strongest coefficient indicator that indicates a position of the strongest coefficient for all of the plurality of linear combining coefficient matrices ($\tilde{W}_2$s) for the plurality of time instances for that layer.

In one embodiment, each of the plurality of linear combination coefficient matrices is represented by a set of amplitude coefficient indicators and a set of phase coefficient indicators.

Corresponding embodiments of a UE are also disclosed. In one embodiment, a UE is adapted to generate CSI comprising NZCs of a plurality of linear combining coefficient matrices ($\tilde{W}_2$s) for a plurality of time instances, respectively, and at least one NZC bitmap that indicates positions of the NZCs in the plurality of $\tilde{W}_2$s for the plurality of time instances. The at least one NZC bitmap comprises either a common NZC bitmap for all of the plurality of time instances per each reported layer, or a common NZC bitmap for all of the plurality of times for all reported layers, or a first common NZC bitmap for all of the plurality of time instances for a first set of reported layers and separate NZC bitmaps for all of the plurality of time instances for a second set of report layers, or two or more common NZC bitmaps for two or more sets of reported layers, respectively. The UE is further adapted to report the CSI to a network node.

In one embodiment, a UE comprises a communication interface and processing circuitry associated with the communication interface. The processing circuitry is configured to cause the UE to generate CSI comprising NZCs of a plurality of linear combining coefficient matrices ($\tilde{W}_2$s) for a plurality of time instances, respectively, and at least one NZC bitmap that indicates positions of the NZCs in the plurality of $\tilde{W}_2$s for the plurality of time instances. The at least one NZC bitmap comprises either a common NZC bitmap for all of the plurality of time instances per each reported layer, or a common NZC bitmap for all of the plurality of times for all reported layers, or a first common NZC bitmap for all of the plurality of time instances for a first set of reported layers and separate NZC bitmaps for all of the plurality of time instances for a second set of report layers, or two or more common NZC bitmaps for two or more sets of reported layers, respectively. The processing circuitry is further configured to cause the UE to report the CSI to a network node.

Embodiments of a method performed by a network node are also disclosed. In one embodiment, a method performed by a network node comprises receiving a CSI report comprising CSI. The CSI comprises NZCs of a set of linear combining coefficients, wherein the set of linear combining coefficients are associated with a number, L, of selected DFT basis vectors in SD, a number, M, of selected DFT basis vectors in FD, and $$M_v^{DD}$$

selected DFT basis vectors in DD. The CSI further comprises, for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD. The method further comprises performing one or more operational tasks based on the CSI.

Corresponding embodiments of a network node are also disclosed. In one embodiment, a network node is adapted to receive a CSI report comprising CSI. The CSI comprises NZCs of a set of linear combining coefficients, wherein the set of linear combining coefficients are associated with a number, L, of selected DFT basis vectors in SD, a number, M, of selected DFT basis vectors in FD, and $$M_v^{DD}$$

selected DFT basis vectors in DD. The CSI further comprises, for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD. The network node is further adapted to perform one or more operational tasks based on the CSI.

In one embodiment, a network node comprises processing circuitry configured to cause the network node to receive a CSI report comprising CSI. The CSI comprises NZCs of a set of linear combining coefficients, wherein the set of linear combining coefficients are associated with a number, L, of selected DFT basis vectors in SD, a number, M, of selected DFT basis vectors in FD, and $$M_v^{DD}$$

selected DFT basis vectors in DD. The CSI further comprises, for each reported layer, a set of $$M_v^{DD}$$

NZC bitmaps that indicates positions of the NZCs, wherein the set of $$M_v^{DD}$$

NC bitmaps comprises a separate bitmap for each selected DFT basis vector in DD in the set of $$M_v^{DD}$$

selected DFT basis vectors in DD. The processing circuitry is further configured to cause the network node to perform one or more operational tasks based on the CSI.

In another embodiment, a method performed by a network node comprises receiving a CSI report comprising CSI. The CSI comprises NZCs of a plurality of linear combining coefficient matrices ($\tilde{W}_2$s) for a plurality of time instances, respectively, and at least one NZC bitmap that indicates positions of the NZCs in the plurality of $\tilde{W}_2$s for the plurality of time instances. The at least one NZC bitmap comprises either: a common NZC bitmap for all of the plurality of time instances per each reported layer, or a common NZC bitmap for all of the plurality of times for all reported layers, or a first common NZC bitmap for all of the plurality of time instances for a first set of reported layers and separate NZC bitmaps for all of the plurality of time instances for a second set of report layers, or two or more common NZC bitmaps for two or more sets of reported layers, respectively. The method further comprises performing one or more operational tasks based on the CSI.

Corresponding embodiments of a network node are also disclosed. In one embodiment, a network node is adapted to receive a CSI report comprising CSI. The CSI comprises NZCs of a plurality of linear combining coefficient matrices ($\tilde{W}_2$s) for a plurality of time instances, respectively, and at least one NZC bitmap that indicates positions of the NZCs in the plurality of $\tilde{W}_2$s for the plurality of time instances. The at least one NZC bitmap comprises either: a common NZC bitmap for all of the plurality of time instances per each reported layer, or a common NZC bitmap for all of the plurality of times for all reported layers, or a first common NZC bitmap for all of the plurality of time instances for a first set of reported layers and separate NZC bitmaps for all of the plurality of time instances for a second set of report layers, or two or more common NZC bitmaps for two or more sets of reported layers, respectively. The network node is further adapted to perform one or more operational tasks based on the CSI.

In one embodiment, a network node comprises processing circuitry configured to cause the network node to receive a CSI report comprising CSI. The CSI comprises NZCs of a plurality of linear combining coefficient matrices ($\tilde{W}_2$s) for a plurality of time instances, respectively, and at least one NZC bitmap that indicates positions of the NZCs in the plurality of $\tilde{W}_2$s for the plurality of time instances. The at least one NZC bitmap comprises either: a common NZC bitmap for all of the plurality of time instances per each reported layer, or a common NZC bitmap for all of the plurality of times for all reported layers, or a first common NZC bitmap for all of the plurality of time instances for a first set of reported layers and separate NZC bitmaps for all of the plurality of time instances for a second set of report layers, or two or more common NZC bitmaps for two or more sets of reported layers, respectively. The processing circuitry is further configured to cause the network node to perform one or more operational tasks based on the CSI.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 illustrates an example embodiment in which Rel-18 Type-II CSI is reported (e.g., in step 606 of FIG. 6) as a single Precoding Matrix Indicator (PMI) value corresponding to the codebook indices of $i_1$ and $i_2$ where $i_1$ and $i_2$ are defined as shown in the illustrated equations;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s). Currently, it is not clear how the non-zero coefficients in the linear combining coefficient matrix $\tilde{W}_2$ shall be indicated for the Rel-18 Type II codebook for high/medium User Equipment (UE) velocities.

Certain aspects of the disclosure and their embodiments may provide solutions to these or other challenges. Systems and methods are disclosed herein that provide efficient ways to indicate the non-zero coefficients in the linear combining coefficient matrix $\tilde{W}_2$ for the (e.g., Rel-18) Type II codebook structure for high/medium UE velocities. The Rel-18 Type II codebook structure for high/medium UE velocities is oftentimes used herein as an example.

If multiple $\tilde{W}_2$s are used in the Rel-18 Type II codebook structure for high/medium UE velocities, a non-zero coefficient bitmap that is common for all $\tilde{W}_2$s is used. In some embodiments, this holds for all the reported layers, whereas in some embodiments this holds only for the strongest layers.

If a compressed $\tilde{W}_2$, is used in the Rel-18 Type II codebook structure for high/medium UE velocities, separate bitmaps are used for each Doppler-Domain (DD) and/or each Time-Domain (TD) basis vector. Note that the terms Doppler-Domain and Time-Domain are used interchangeably herein.

Certain embodiments may provide one or more of the following technical advantage(s). Embodiments of the proposed solutions may enable indication of the non-zero coefficients for the Rel-18 Type II codebook for high/medium UE velocities with low overhead while still capturing the significant channel information.

1 Bitmap for Indicating Non-Zero Coefficients

Figure 1:
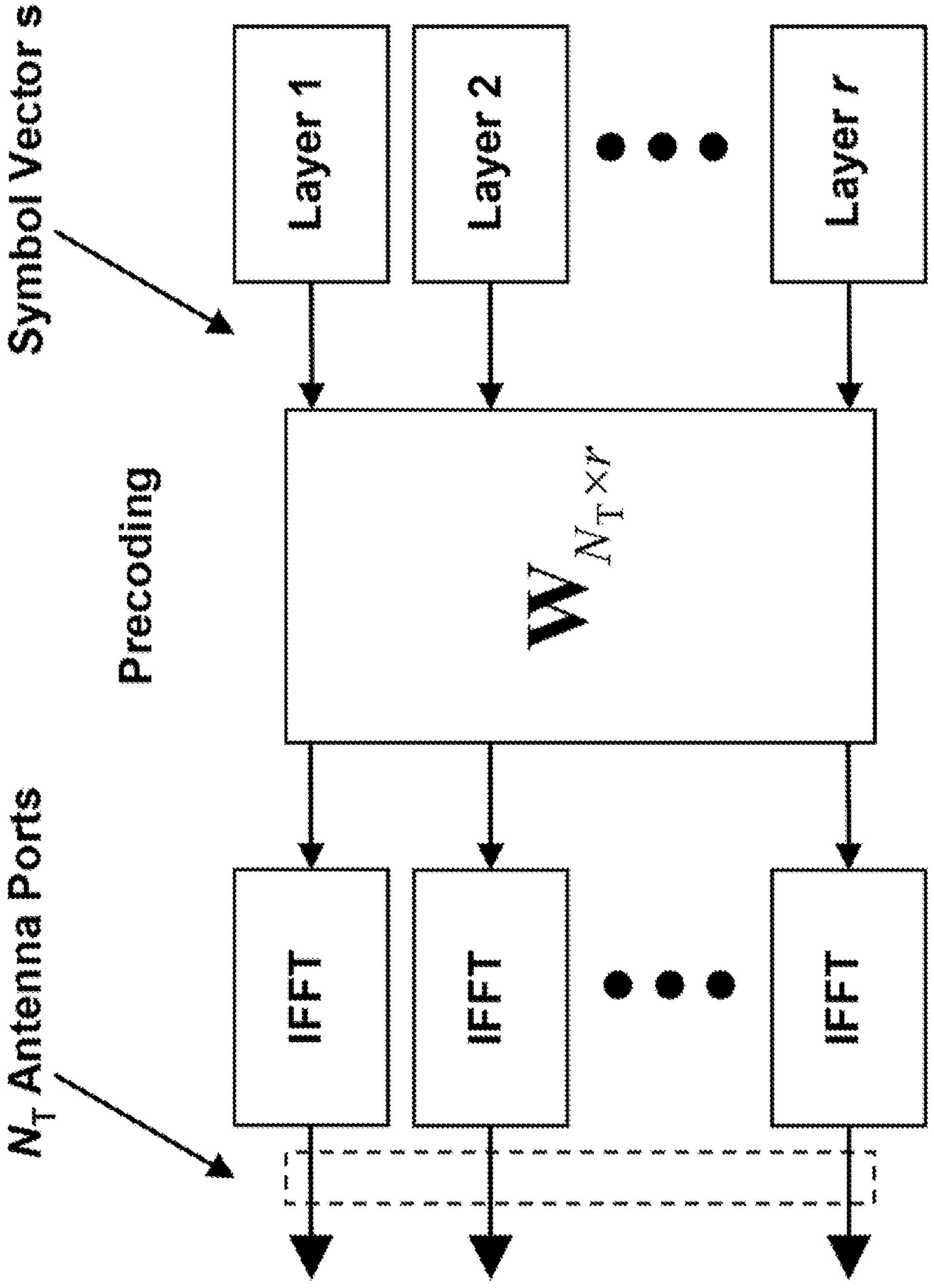
FIG. 1 illustrates an example of the spatial multiplexing operation in New Radio (NR)
Figure 2:
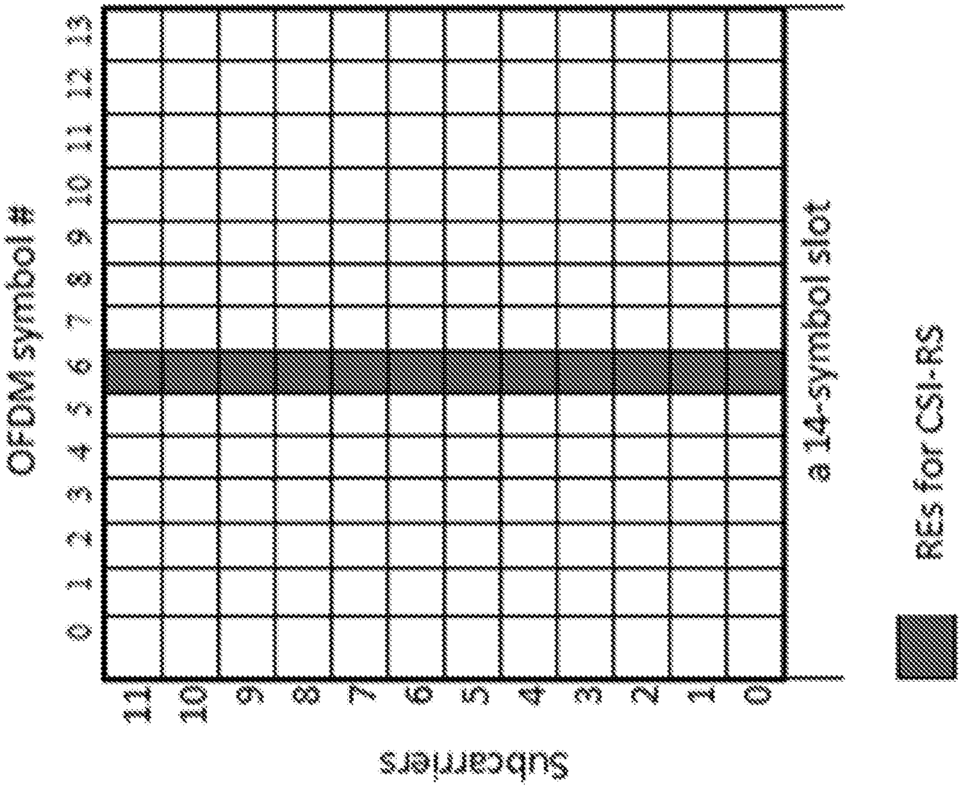
FIG. 2 shows an example of Channel State Information Reference Signal (CSI-RS) Resource Elements (REs) for 12 antenna ports, where 1 RE per Resource Block (RB) per port is shown.
Figure 3:
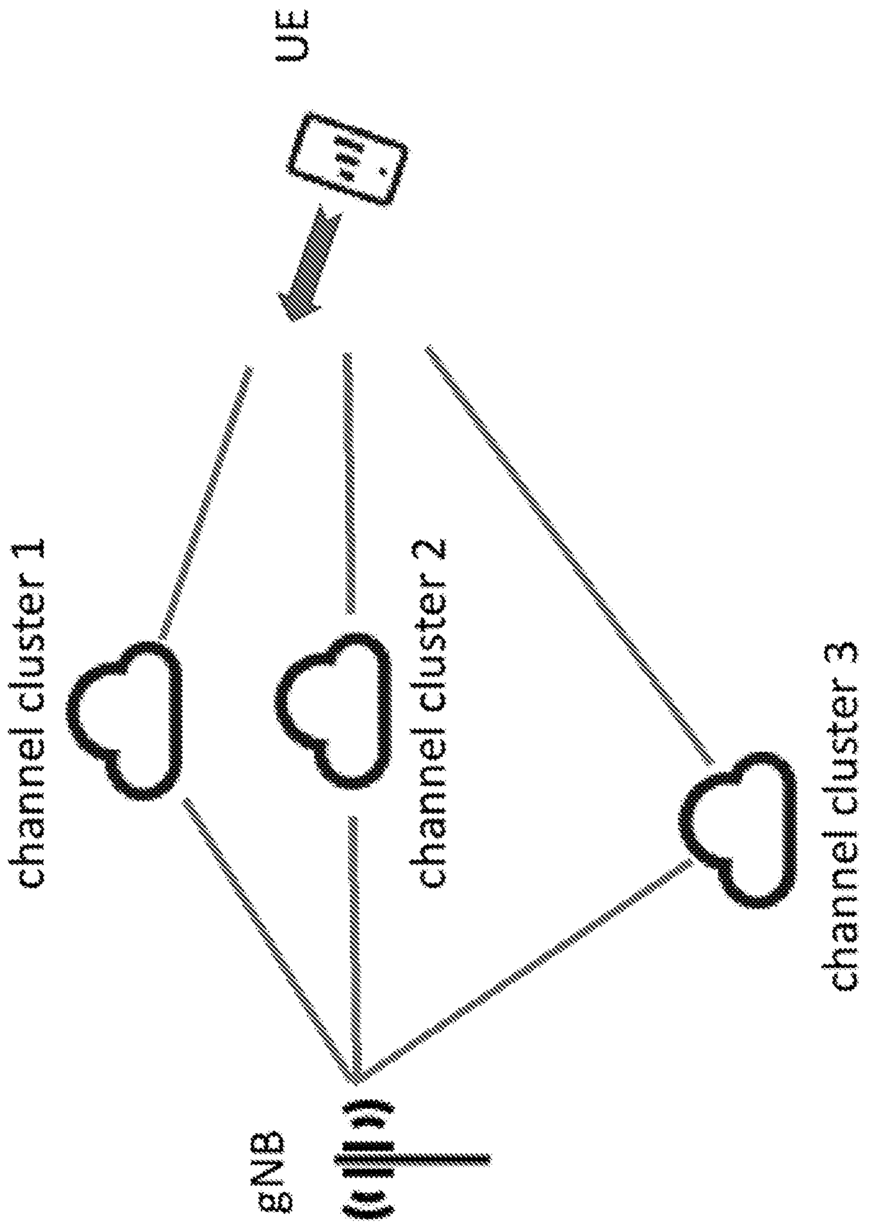
FIG. 3 illustrates a schematic example with three dominating propagation paths between a next generation NodeB (gNB) and a User Equipment (UE) which is conveyed through three different channel clusters.

In the Rel-16 Type II codebook, the coefficients in $\tilde{W}'_2$ represent the relative amplitude and phase of channel clusters in angle-delay domain. FIG. 3 illustrates a schematic example with three dominating propagation paths between a next generation NodeB (gNB) and a UE which is conveyed through three different channel clusters. Since the different clusters have different angle-of-departures (AODs) and the different paths have different propagation delays, the three clusters can be distinguished in a joint angle-delay domain. The coefficients in $\tilde{W}'_2$ give information on how to combine these clusters in the best way for each transmission layer. In FIG. 3, the UE is moving in a direction indicated by the arrow. The different paths will then also have different Doppler shifts since the relative angle between the velocity vector and the arrival path of the cluster is different for different clusters. With the Rel-18 Type II codebook, it can be possible to distinguish different Doppler components by introducing a time-domain (TD) or Doppler-domain (DD) basis, $\tilde{W}_d$, in addition to $\tilde{W}_1$ and $\tilde{W}_f$. The linear combining coefficients for the Rel-18 Type II codebook is denoted as $\tilde{W}_2$.

In the Rel-18 Evolved Multiple Input Multiple Output (MIMO) Work Item (WI) on Channel State Information (CSI) enhancements for high/medium mobility, different options are being considered for reporting of $\tilde{W}_2$. These options can be classified into two categories:

- Reporting multiple $\tilde{W}_2$s along with a single $\tilde{W}_1$ and $\tilde{W}_f$. The multiple $\tilde{W}_2$s then correspond to Rel-16 $\tilde{W}'_2$ matrices for different slots in time.
- Reporting a $\tilde{W}_2$ which is a compressed representation of multiple Rel-16 $\tilde{W}'_2$ for different slots in time. The objective with the compression is to reduce the reporting overhead. This is possible due to that different clusters have different Doppler components as illustrated in FIG. 3. The compression is achieved by a Discrete Fourier Transform (DFT) matrix, $\tilde{W}_d$, that compresses the channel in Doppler domain. In this case, the coefficients in $\tilde{W}_2$ represent the relative amplitude and phase of channel clusters in angle-delay-Doppler domain.

It is unnecessary to report all coefficients in $\tilde{W}_2$ since some coefficients are weak. Reporting all coefficients would lead to an excessive reporting overhead. Therefore, a Type II CSI report should contain only the $K_0$ strongest coefficients for each layer. In order for the gNB to know which non-zero coefficients (NZCs) have been reported, a bitmap that indicates the NZCs is included in the CSI report.

In the following, different embodiments related to how such a bitmap could be designed for a Rel-18 Type II codebook for high/medium UE velocities are disclosed. Different solutions are proposed depending on if a CSI report comprises multiple $\tilde{W}_2$s or a compressed $\tilde{W}_2$.

1.1 Reporting Multiple $\tilde{W}_2$s

In this case, the coefficients in $\tilde{W}_2$ represent the relative amplitude and phase of channel clusters in angle-delay domain for different time instances (e.g., slots). The bitmap that indicates the NZCs in $\tilde{W}_2$ identifies the strongest clusters. Since the clusters do not change over the short time that $\tilde{W}_2$ is computed, it can be expected the strongest clusters will remain the same during this time period, although the small-scale fading within a cluster will cause some amplitude variations.

Figure 4:
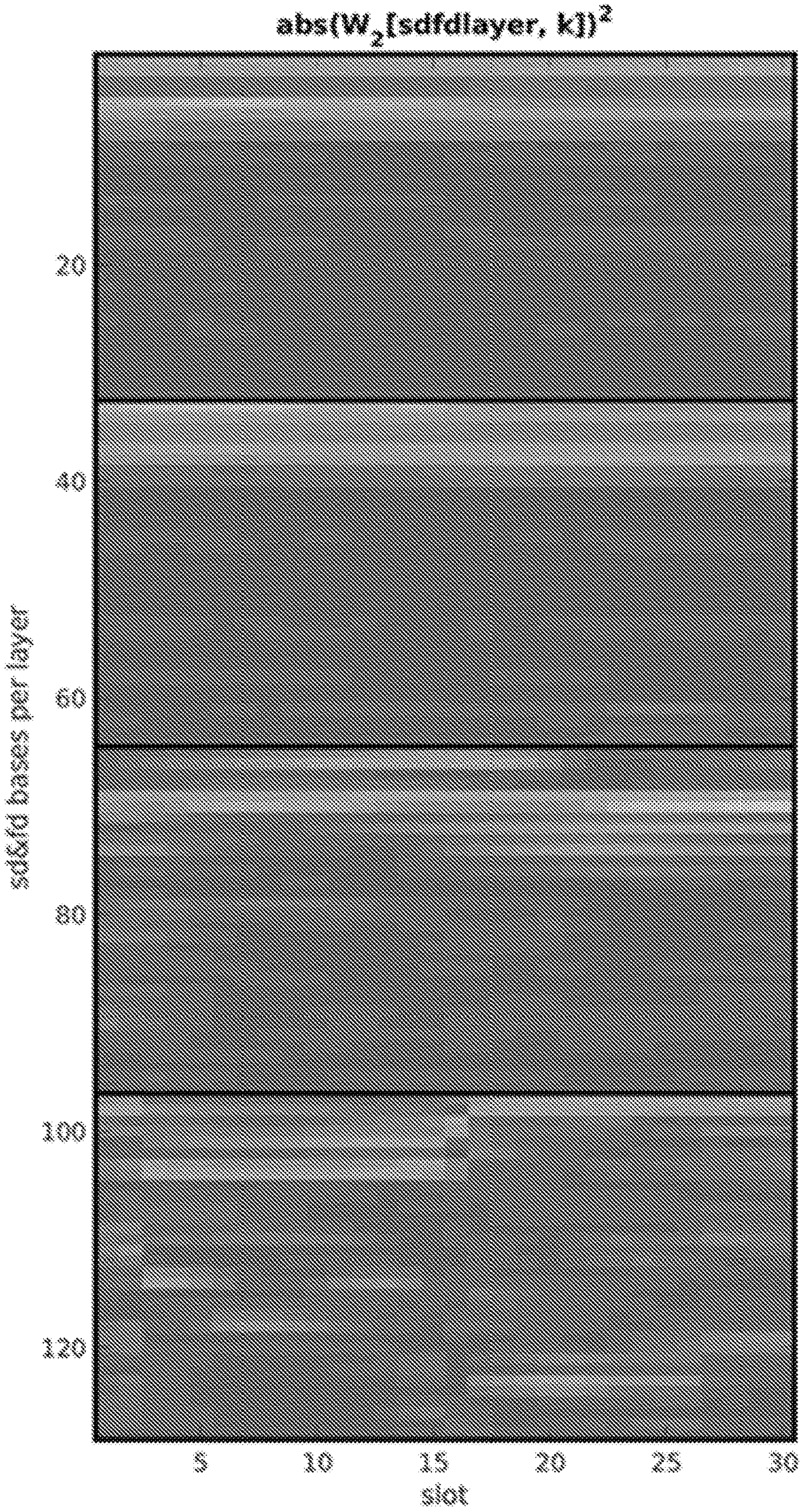
FIG. 4 illustrates simulation results in the form of a plot that shows relative power for all coefficients in $\tilde{W}_2$ for four different layers over 20 consecutive slots.

This conjecture has been verified by simulations as shown in FIG. 4. The plot shows the relative power for all coefficients in $\tilde{W}_2$ for four different layers over 20 consecutive slots. Brightness is proportional to power. In FIG. 4, the 2L×M matrix $\tilde{W}_2$ for four layers has been vectorized to a 4·2LM×1 vector for each slot, so each row shows the time evolution of each coefficient in $\tilde{W}_2$ for one layer. The strongest layers are at the top rows while the weakest layers are at the bottom rows. It can be seen that the strongest coefficients remain the same over the 20 slots for the strong layers. For the weak layers, the strongest coefficients are also quite stable but there are some variations.

Figure 5A:
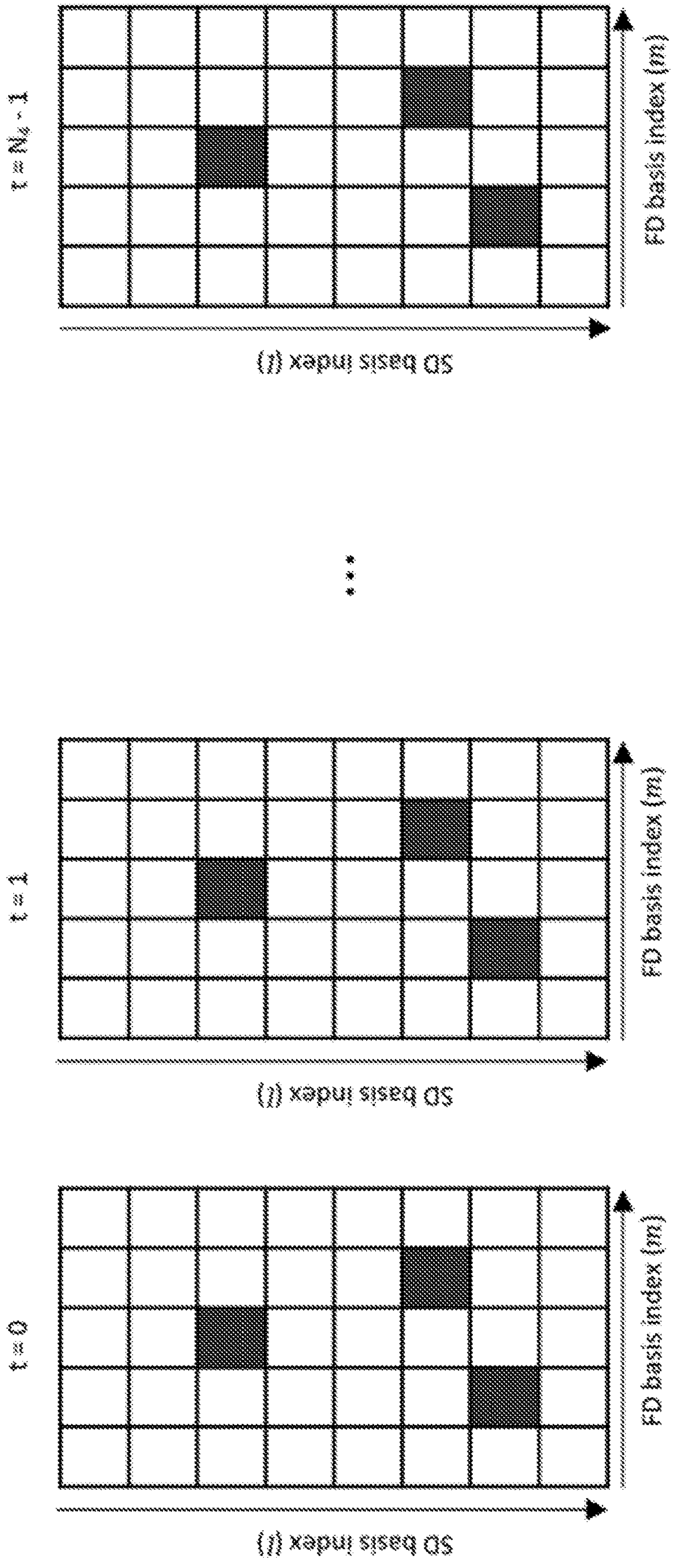
FIG. 5A illustrates a bitmap structure for reporting Non-Zero Coefficients (NZCs) in $N_4$ different $\tilde{W}_2$ matrices, in accordance with one example embodiment of the present disclosure.

A bitmap structure for reporting NZCs in $N_4$ different $\tilde{W}_2$ matrices is illustrated in FIG. 5A. In general, indicating the NZCs in $N_4$ different $\tilde{W}_2$ matrices would require a bitmap with $2LMN_4$ bits. However, since the bitmap can be assumed to be similar for all slots, in one embodiment, a common bitmap is used for all slots for the case when multiple $\tilde{W}_2$s are reported. In this way, the number of bits in the bitmap can be reduced from $2LMN_4$ to 2LM compared to having a separate bitmap for $\tilde{W}_2$ at each slot. Although the proposed bitmap has a size that corresponds to a single $\tilde{W}_2$, the network node (e.g., gNB) can use the reported bitmap for all $\tilde{W}_2$s. In the below embodiments, $N_4$ represents the number of different $\tilde{W}_2$s reported corresponding to $N_4$ slots but wherein all $N_4$ $\tilde{W}_2$s are reported in a single CSI reporting instance (e.g., in a single PUSCH in a single reporting slot). In some embodiments, the $N_4$ slots are in non-consecutive slots. In some other embodiments, the $N_4$ slots are consecutive slots.

In one embodiment, a common non-zero coefficient bitmap is used for all $N_4$ slots per each reported layer. That is, a first common non-zero coefficient bitmap is used for all $N_4$ slots for a first layer; a second common non-zero coefficient bitmap is used for all $N_4$ slots for a second layer, etc.

In an optional embodiment, a common non-zero coefficient bitmap is used for all $N_4$ slots for all reported layers.

In another embodiment, the reported layers are divided into two sets. For each layer in the first set, a common non-zero coefficient bitmap is used for all $N_4$ slots. For each layer in the second set, separate non-zero coefficient bitmaps are used for all $N_4$ slots. For example, in case of four reported layers, the first set can comprise the two strongest layers and the second set can comprise the two weakest layers. In this case, each of the two strongest layers uses a non-zero coefficient bitmap that is common for all $N_4$ slots while each of the two weakest layers uses a non-zero coefficient bitmap that is separate for all $N_4$ slots. In another example, the UE determines which layers can have a common bitmap for all slots and which layers that should have separate bitmaps for different slots based on, e.g., how stable the strongest coefficients are over time for the different layers. In one further embodiment, the layers associated with the first set and the layers associated with the second set are also reported as part of the CSI feedback. In another embodiment, the layers are ordered according to their strength (given by, e.g., corresponding singular values). In this case, the number of layers that uses a common bitmap for all slots can either be signaled by the UE to the gNB, configured by the gNB and signaled to the UE, or defined in specification.

In an optional embodiment, a first common non-zero coefficient bitmap is used for all $N_4$ slots for a first set of reported layers while for a second set of reported layers a second common non-zero coefficient bitmap is used for all $N_4$ slots. For example, in case of four reported layers, the two strongest layers use a first common non-zero coefficient bitmap while the two weakest layers use second common non-zero coefficient bitmaps. In one further embodiment, the layers associated with the first common non-zero coefficient bitmap and the layers associated with the second common non-zero coefficient bitmap are also reported as part of the CSI feedback.

In the above embodiments, a common non-zero coefficient bitmap is used for all $N_4$ slots. In an alternative embodiment, a first common non-zero coefficient bitmap may be used for a first subset of slots among the $N_4$ slots, and a second common non-zero coefficient bitmap may be used for a second subset of slots among the $N_4$ slots. In one further embodiment the slots associated with the different subsets of slots are also reported as part of the CSI feedback.

In one embodiment, the UE determines a common non-zero coefficient bitmap based on only one $\tilde{W}_2$, e.g., $\tilde{W}_2$ corresponding to the first slot of the $N_4$ slots.

In another embodiment, the UE determines a common non-zero coefficient bitmap based on $\tilde{W}_2$ for multiple time slots among the $N_4$ slots, e.g., based on the power summed over all $N_4$ slots or a subset of $N_4$ slots.

1.2 Reporting a Compressed $\tilde{W}_2$

In this embodiment, coefficients in a compressed linear combining coefficient matrix ($\tilde{W}_2$) is reported. As noted above, the compressed linear combining coefficient matrix ($\tilde{W}_2$) can be defined as $\tilde{W}_2(\tilde{W}_f \otimes \tilde{W}_d)^H$ where the linear combining coefficients $\tilde{W}_2$ are the resulting coefficient after compression in the frequency domain by a set of M FD basis vectors $\tilde{W}_f$ and compression in the DD (or TD) by a set $$M_v^{DD}$$

DD basis vectors $\tilde{W}_d$.

Figure 5B:
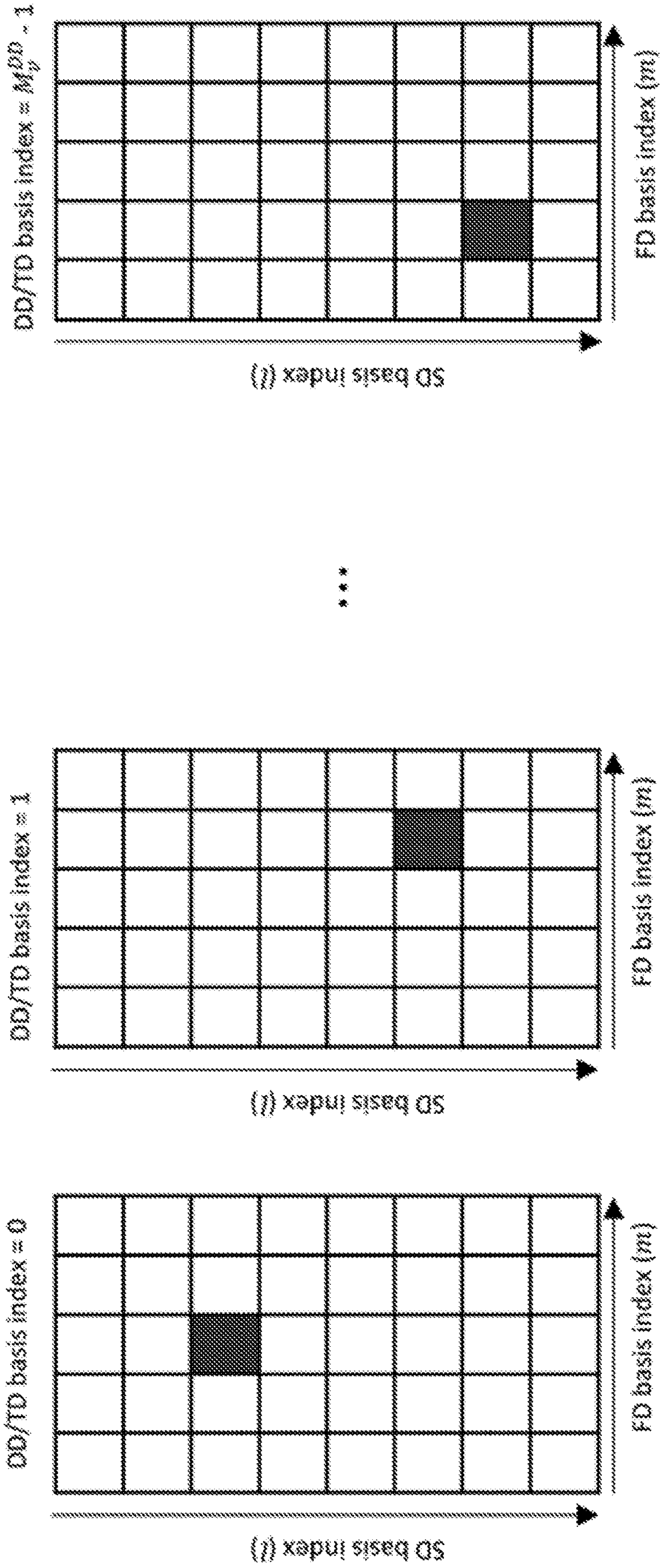
FIG. 5B illustrates an example with a potential bitmap for a case with three channel clusters where a bitmap over the Spatial Domain (SD) and Frequency Domain (FD) basis indices is shown for each Doppler Domain (DD)/Time Domain (TD) basis index, in accordance with one example embodiment of the present disclosure.

In this case, the coefficients in $\tilde{W}_2$ represent the relative amplitude and phase of channel clusters in angle-delay-Doppler domain. As illustrated in FIG. 3, different channel clusters can have different Doppler components. Therefore, one cannot assume that the strongest coefficients are the same for different DD/TD basis vectors. An example with a potential bitmap for a case with three channel clusters is shown in FIG. 5B where a bitmap over the SD and FD basis indices is shown for each DD/TD basis index.

Consequently, for the case with a compressed $\tilde{W}_2$, it cannot be assumed that a common bitmap can be used for all DD/TD basis vectors. It is therefore proposed herein to, in one embodiment, use a separate bitmap for each DD/TD basis vector. Let us denote the number of selected DD/TD basis vectors in matrix $W_d$ by the number $$M_v^{DD}.$$

Then, for each reported layer, $$M_v^{DD}$$

different non-zero coefficient bitmaps are used where each of the $$M_v^{DD}$$

non-zero coefficient bitmaps correspond to one selected DD/TD basis vector. Each such bitmap may be of size 2LM bits. Hence, in this embodiment, when the bitmap is reported by the UE, each bitmap may correspond to one reported layer and one selected DD/TD basis vector (e.g., the UE may report the non-zero coefficient bitmap via index $i_{1,7,l,d}$ where l represents the reported layer index and d represents the selected DD/TD basis vector index, see Section 3).

In one embodiment, the maximum number of NZC per layer is determined, configured, or defined per selected DD/TD basis.

In another embodiment, the maximum number of NZC per layer is determined, configured, or defined by the total number of NZC for all selected DD/TD basis vectors.

In an alternative embodiment, DD/TD basis vectors may be selected for different combination of SD and/or FD bases vectors. Hence, in this alternative embodiment, a first non-zero coefficient bitmap may be used for a first combination of SD and/or FD bases vectors and a second non-zero coefficient bitmap may be used for a second combination of SD and/or FD bases vectors. Assuming $$\tilde{M}_v^{DD}$$

DD/TD basis vectors are selected for each combination of SD and/or FD bases vectors, then a non-zero coefficient bitmap of length $$2L'M'\tilde{M}_v^{DD}$$

may be used where L' and M' respectively are the number of SD basis vectors and the number of FD basis vectors in the combination of SD and/or FD basis vectors.

1.3 Procedure in Accordance with Embodiments of Sections 1.1 and 1.2

Figure 6:
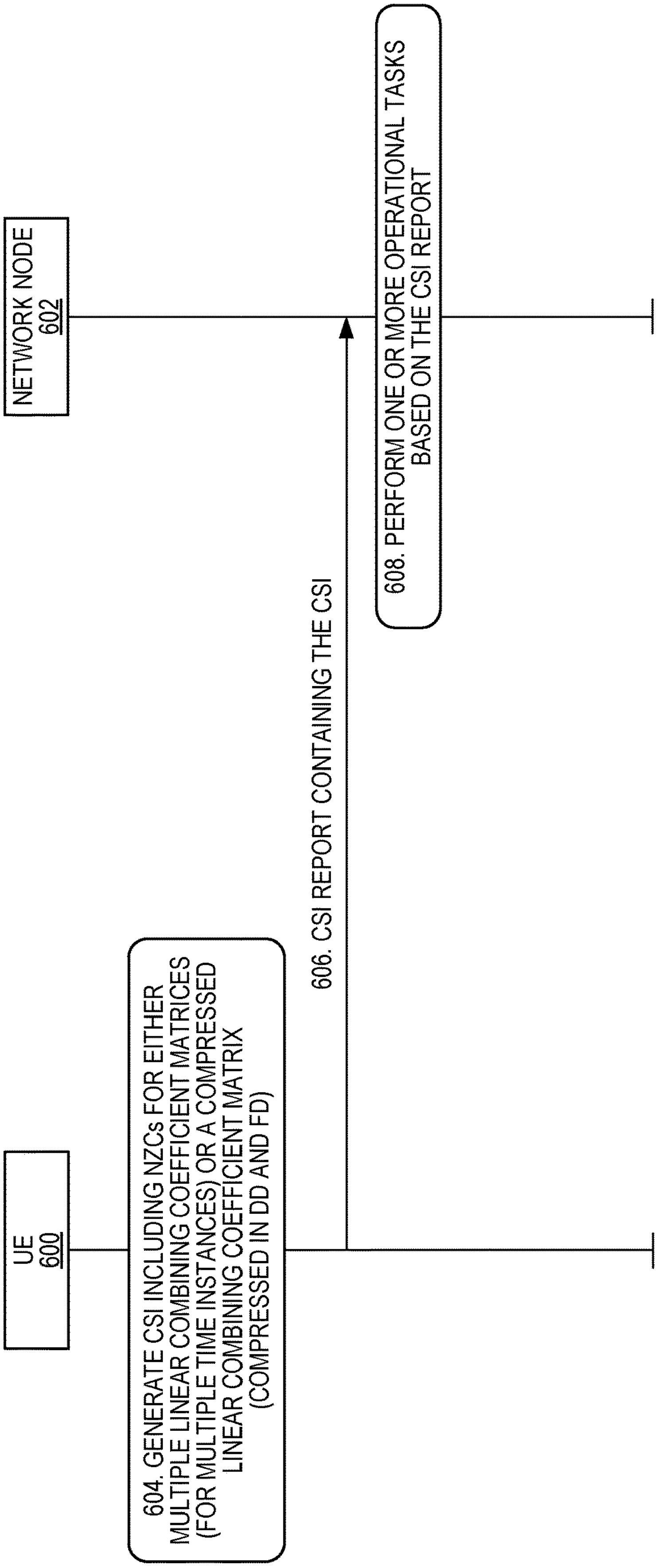
FIG. 6 illustrates the operation of a UE and a network for Channel State Information (CSI) feedback in accordance with one example embodiment of the present disclosure.

FIG. 6 illustrates the operation of a UE 600 and a network node 602 (e.g., a base station such as, e.g., a gNB or a network node that performs part of the functionality of a base station such as, e.g., a gNB Distributed Unit (gNB-DU) or gNB Central Unit (gNB-CU) in a split architecture), in accordance with one example embodiment of the present disclosure. As illustrated, the UE 600 generates Channel State Information (CSI) (step 604). The CSI includes NZCs for multiple $\tilde{W}_2$s or a compressed $\tilde{W}_2$ as well as NZC bitmap(s) in accordance with any of the embodiments described above in section 1.1 or section 1.2.

For example, as described above in section 1.1, in one embodiment, the CSI includes NZCs of a plurality of linear combining coefficient matrices ($\tilde{W}_2$s) for a plurality of time instances (e.g., slots), respectively. In one embodiment, each $\tilde{W}_2$ represents a relative amplitude and phase of channel clusters in angle-delay domain for a respective time instance. The CSI also includes at least one NZC bitmap that indicates positions of the NZCs in the plurality of $\tilde{W}_2$s for the plurality of time instances. In one embodiment, each of the plurality of linear combination coefficient matrices is represented by a set of amplitude coefficient indicators and a set of phase coefficient indicators. In accordance with the embodiments described above in section 1.1, the at least one NZC bitmap includes any one of the following, depending on the embodiment:

- a common NZC bitmap for all of the plurality of time instances per each reported layer; or
- a common NZC bitmap for all of the plurality of times for all reported layers; or
- a first common NZC bitmap for all of the plurality of time instances for a first set of reported layers and separate NZC bitmaps for all of the plurality of time instances for a second set of report layers; or
- two or more common NZC bitmaps for two or more sets of reported layers, respectively. Further details of the at least one NZC bitmap are provided above and not repeated here.

As another example as described above in section 1.2, in another embodiment, the CSI includes NZCs for a compressed linear combining coefficient matrix ($\tilde{W}_2$), which is a compressed representation of a plurality of linear combining coefficient matrices for a plurality of time instances. In one embodiment, each of the plurality of linear combination coefficient matrices is represented by a set of amplitude coefficient indicators and a set of phase coefficient indicators. As described above, the compression is achieved via a DFT matrix, $W_d$, that compresses the channel in Doppler domain. In one embodiment, the compression is achieved via a DFT matrix, $W_d$, that compresses the channel in Doppler domain such that coefficients in $\tilde{W}_2$ represent a relative amplitude and phase of channel clusters in angle-delay-Doppler domain. As further described above, the compressed linear combining coefficient matrix ($\tilde{W}_2$) comprises a set of $$M_v^{DD}$$

DD/TD basis vectors. For each reported layer, a set of $$M_v^{DD}$$

NZC bitmaps that indicates positions of the NZCs in respective DD/TD basis vectors of the compressed linear combining coefficient matrix ($\tilde{W}_2$). Various embodiments are described above relating to the maximum number of NZCs per layer.

As described below, optionally, in one embodiment, the CSI further includes one or more Strongest Coefficient Indicators (SCIs). In another optional alternative embodiment, the SCI(s) may be provided separate from the CSI.

The UE 600 reports the CSI to the network node 602 (step 606). The network node 602 uses the CSI for one or more operational tasks (step 608), as will be appreciated by those of skill in the art. These operational tasks are not the focus the present disclosure and, as such, the details are not provided here. However, it should be noted that the CSI provided in accordance with embodiments of the present disclosure enable indication of the NZCs for, e.g., Rel-18 Type II codebook for high/medium UE velocities with low overhead while still capturing the significant channel information.

2 Strongest Coefficient Indicator

For each layer, the elements of $\tilde{W}_2$ are quantized before being reported in a CSI report. To be more specific, each element in $\tilde{W}_2$, if reported, is first normalized with respect to the strongest coefficient of that layer. Then, the amplitude and phase of all the normalized coefficients, except the strongest coefficient, is quantized and reported. Since the strongest coefficient always has unit amplitude and zero phase, it does not need to be reported. Instead, the strongest coefficient indicator, SCI, is reported to identify the location of the strongest coefficient. Method for SCI reporting is still an open question for the Rel-18 Type II CSI enhancement, we hereby proposed our solutions depending on how $\tilde{W}_2$ is reported.

When multiple $\tilde{W}_2$s are reported for each layer, as explained in Section 1.1, the SCI can be reported in two ways.

In one embodiment, a single SCI for a single reference $\tilde{W}_2$ is reported for a given layer. The SCI is used to identify all the strongest coefficients for all the $\tilde{W}_2$s at different time instances for that layer. The reference $\tilde{W}_2$ is the coefficient matrix at a given time instance, e.g., at the first time instance. This method can save overhead for reporting SCI especially when the Doppler spread for each path, or in other words, for each angle-delay pair, is relatively small. Then, the variation of the coefficients of $\tilde{W}_2$s for different time instances is mainly a phase shift, whereas the amplitude is rather stable, hence a strong coefficient for $\tilde{W}_2$ at one time instance is also a strong coefficient for at $\tilde{W}_2$ another time instance. The above argument can be supported by FIG. 4, where the strongest coefficients, especially for the most significant two layers (upper half of FIG. 4), are located in the same row, where each row is associated with a path (or an angle-delay pair).

When the Doppler spread within each angle-delay pair is relatively large, then each path (or angle-delay pair) may contain multiple dominant Doppler components. As a result, not only the phase of the elements in $\tilde{W}_2$s will change over different time instances, but also the amplitude. Hence, the strongest coefficients may appear at different locations for $\tilde{W}_2$s at different time instances. Therefore, there is a need to report an SCI for $\tilde{W}_2$ at each time instance.

In this embodiment, for $\tilde{W}_2$ at each time instance for a given layer, a separate SCI is reported to identify the strongest coefficient for that layer.

When a compressed $\tilde{W}_2$ is reported for each layer, as explained in Section 1.2, a single SCI per layer is reported to identify the strongest coefficient for that layer.

In one embodiment, the said SCI can be associated with any selected SD basis, FD basis and TD (or DD) basis that are reported together with $\tilde{W}_2$.

In another embodiment, the said SCI can be associated with any SD basis, TD (or DD) basis, but it has to be associated with the DC component of FD basis.

In another embodiment, the said SCI can be associated with any SD basis, FD basis, but it has to be associated with the DC component of the TD (or DD) basis.

In another embodiment, the said SCI can be associated with any SD basis, but it has to be associated with the DC component of the FD basis, as well as the DC component of the TD (or FD basis).

3 Report

In one alternative, the Rel-18 Type-II CSI is reported (e.g., in step 606 of FIG. 6) as a single PMI value corresponding to the codebook indices of $i_1$ and $i_2$ where $i_1$ and $i_2$ are defined as shown in the equations below, which are also illustrated in FIG. 7.

The components of $i_1$ represent the selected beams, FD basis, DD basis, the index of the strongest coefficients and bitmaps denoting which coefficients of $\tilde{W}_2$ are reported for each layer. The components of $i_2$ consist of indices indicating the quantized amplitudes and phases of the reported coefficients.

- $i_{1,1}$ $i_{1,2}$ indicate the L spatial beams selected.
- $i_{1,5}$ indicates the set of FD basis from which the reported basis are selected when the number of PMIs to be reported $N_3>19$.
- $i_{1,6,l}$ is a combinatorial index that indicates the selected FD bases for layer l.
- $i_{1,7,l}$ denotes the bitmap whose non-zero bits identify which coefficients of $\tilde{W}_2$ are reported in $i_{2,4,l}$ and $i_{2,5,l}$, for layer l.
- $i_{1,8,l}$ denotes the index of the strongest nonzero coefficient reported in $\tilde{W}_2$ for $\nu=1$ and the index of the strongest spatial beam for $\nu\geq 2$, for layer l.

In an embodiment, $i_{1,9,l}$ indicates the selected Doppler domain bases for layer l and $i_{1,9,l}$ is a combinatorial index indicator of length $$\left\lceil \log_2\left(\begin{matrix} \tilde{N}_4 \\ M_v^{DD} \end{matrix}\right)\right\rceil \text{ bits,}$$

where $\tilde{N}_4$ is the Doppler domain basis vector length and $$M_v^{DD}$$

is the number of Doppler domain basis vectors to be selected.

In another embodiment, $i_{1,9,l}$ indicates the selected Doppler domain bases for layer l, when the zero Doppler basis is always selected. $i_{1,9,l}$ is a combinatorial index indicator of length $$\left\lceil \log_2\left(\begin{matrix} \tilde{N}_4 - 1 \\ M_v^{DD} - 1 \end{matrix}\right)\right\rceil \text{ bits,}$$

where $\tilde{N}_4$ is the Doppler domain basis vector length and $$M_v^{DD}$$

is the number of Doppler domain basis vectors to be selected.

In another embodiment, $i_{1,9,l}$ indicates $N_4$ which is the number of times the common bit map indicated in $i_{1,7,l}$ is duplicated.

In another embodiment, $i_{1,9,l}$ indicates $N_4$, a scalar that can be used to calculate the size of the bitmap $i_{1,7,l}$ when reporting multiple $\tilde{W}_2$ without a common bit map.

Figure 8:
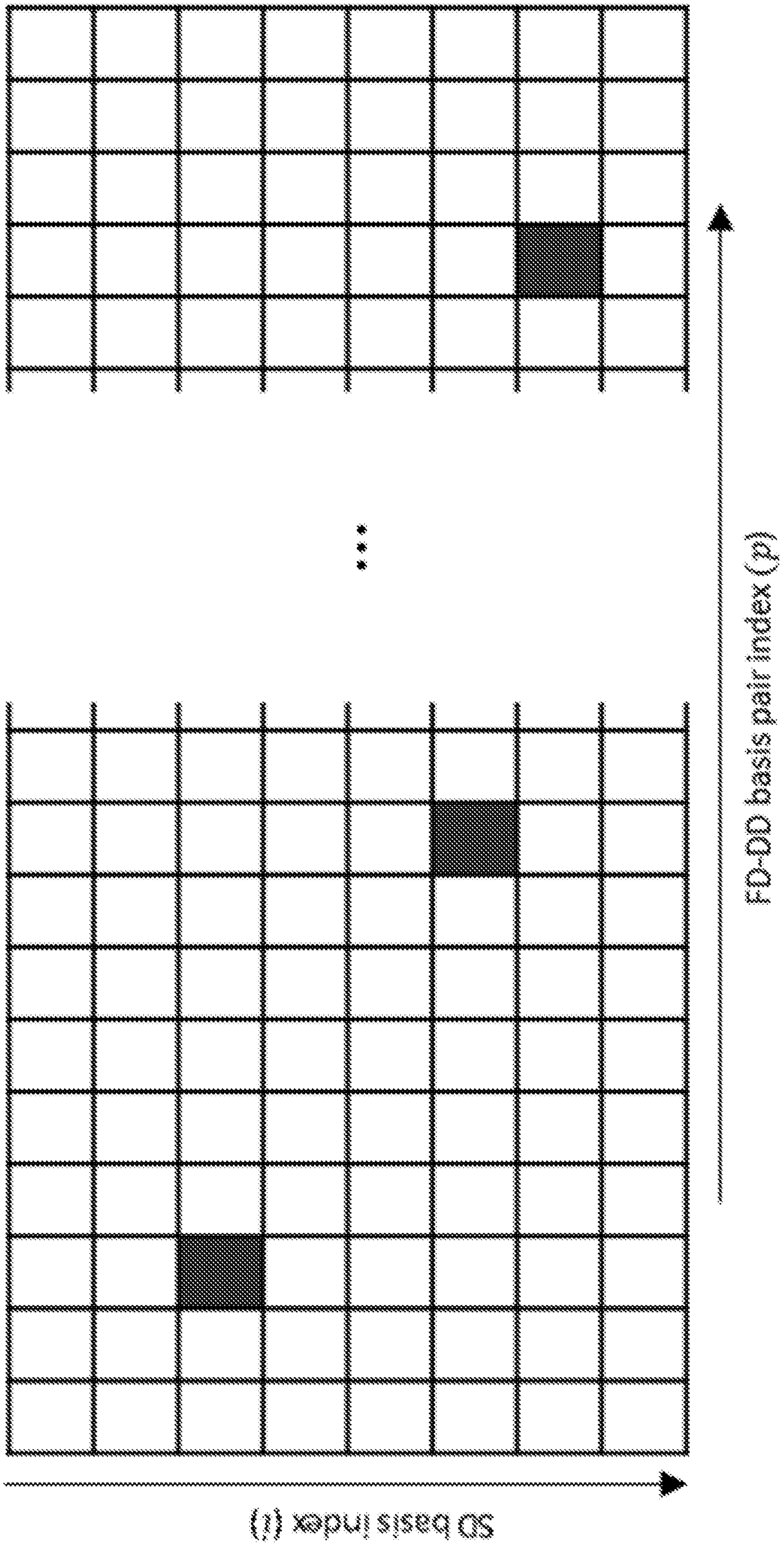
FIG. 8 illustrates a bitmap for layer l, $i_{1,7,l}$, when reporting a compressed $\tilde{W}_2$ using TD/DD basis, in accordance with one example embodiment of the present disclosure.

In an embodiment, when reporting a compressed $\tilde{W}_2$ using TD/DD basis, the bitmap $i_{1,7,l}$ is given by $$i_{1,7,l} = \left[k_{l,0}^{(3)} \cdots k_{l,(M_v^{FD}\times M_v^{DD})-1}^{(3)}\right]$$
$$k_{l,p}^{(3)} = \left[k_{l,0,p}^{(3)} \cdots k_{l,2L-1,p}^{(3)}\right],\ k_{l,i,p}^{(3)} \in \{0, 1\},$$

where $$M_v^{FD} \text{ and } M_v^{DD}$$

are the of number of selected FD and DD basis, respectively; and the index p denotes a selected FD and DD basis pair. The bitmap for layer l, $i_{1,7,l}$, when reporting a compressed $\tilde{W}_2$ using TD/DD basis is illustrated in FIG. 8.

Figure 9:
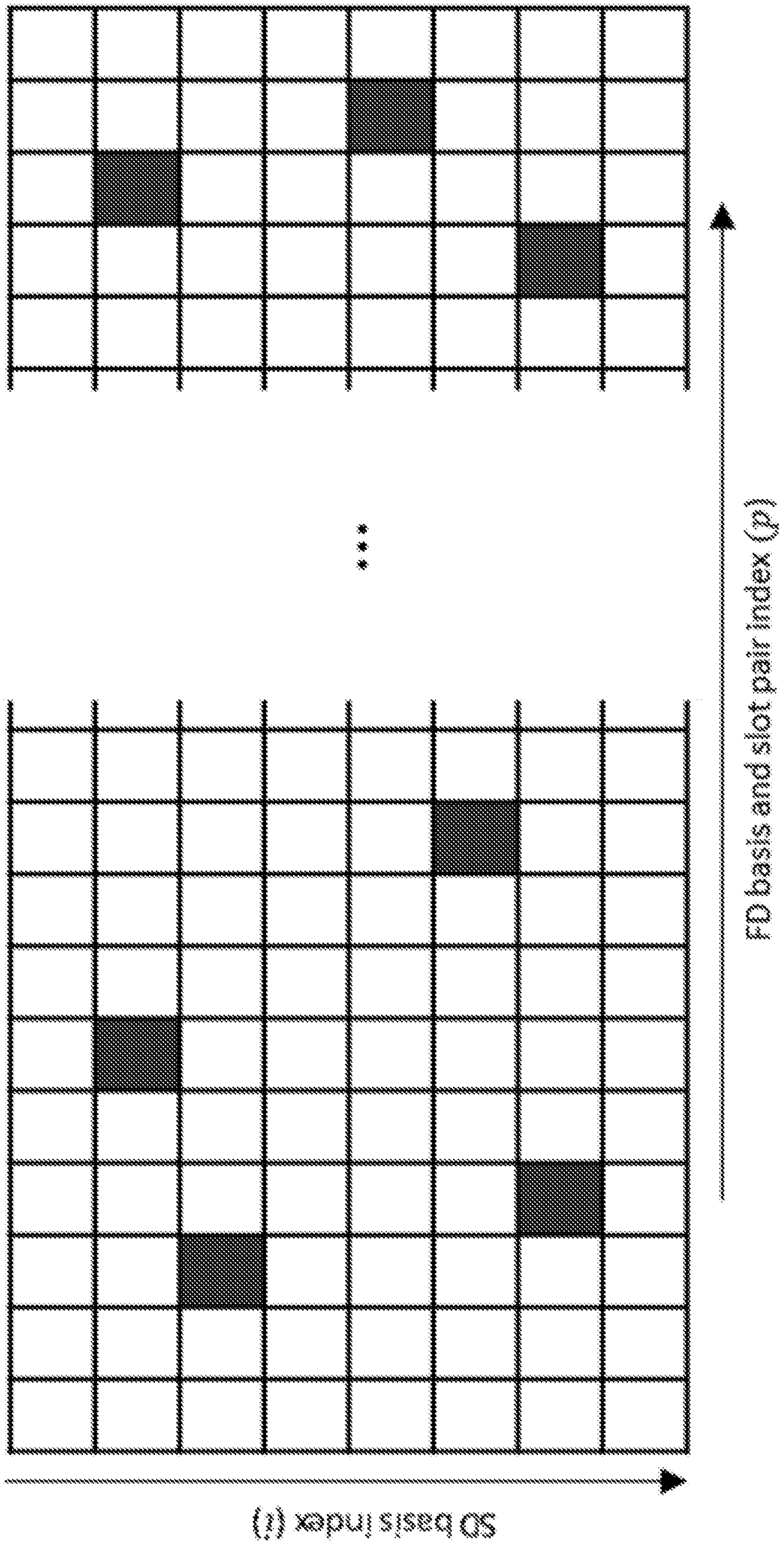
FIG. 9 illustrates a bitmap for layer l, $i_{1,7,l}$, when reporting multiple $\tilde{W}_2$s using a non-common bitmap, in accordance with one example embodiment of the present disclosure.

In an embodiment, when reporting multiple $\tilde{W}_2$s using a non-common bitmap, the bitmap $i_{1,7,l}$ is given by $$i_{1,7,l} = \left[k_{l,0}^{(3)} \cdots k_{l,(M_v^{FD}\times N_4)-1}^{(3)}\right]$$
$$k_{l,p}^{(3)} = \left[k_{l,0,p}^{(3)} \cdots k_{l,2L-1,p}^{(3)}\right],\ k_{l,i,p}^{(3)} \in \{0, 1\},$$

where $$M_v^{FD}$$

is the number of selected FD basis and $N_4$ is the number of $\tilde{W}_2$s reported, and the index p denotes a selected FD basis and slot pair. The bitmap for layer l, $i_{1,7,l}$, when reporting multiple $\tilde{W}_2$s using a non-common bitmap is illustrated in FIG. 9.

Figure 10:
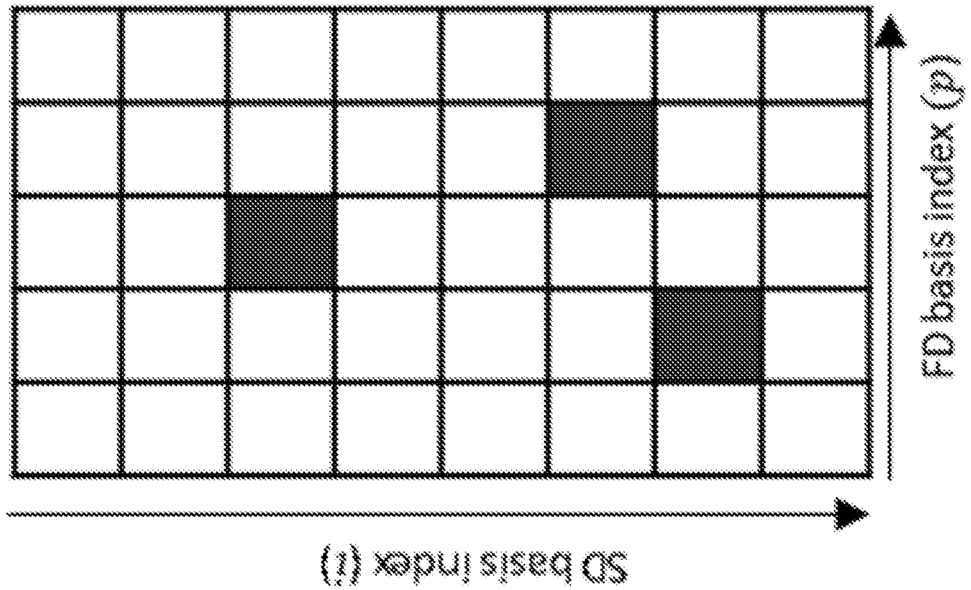
FIG. 10 illustrates a bitmap for layer l, $i_{1,7,l}$, when reporting multiple $\tilde{W}_2$s using a common non-zero coefficient bitmap for all $N_4$ slots, in accordance with one example embodiment of the present disclosure.

In an embodiment, when reporting multiple $\tilde{W}_2$s using a common non-zero coefficient bitmap for all $N_4$ slots per each reported layer, the size of the reported bitmap $i_{17,l}$ can be reduced and is given by $$i_{1,7,l} = \left[k_{l,0}^{(3)} \cdots k_{l,M_v^{FD}-1}^{(3)}\right],$$
$$k_{l,p}^{(3)} = \left[k_{l,0,p}^{(3)} \cdots k_{l,2L-1,p}^{(3)}\right],\ ,\ k_{l,i,p}^{(3)} \in \{0, 1\}.$$

where $$M_v^{FD}$$

is the number of frequency domain basis commonly selected for all the $N_4$ slots and the index p denotes a selected FD basis. The bitmap for layer l, $i_{1,7,l}$, when reporting multiple $\tilde{W}_2$s using a common non-zero coefficient bitmap for all $N_4$ slots is illustrated in FIG. 10.

In an embodiment, the use of common bitmap for $N_4$ slots is deciphered from the size of the bitmap.

In another embodiment, the use of common bitmap for $N_4$ slots is signaled explicitly.

4 Further Description

Figure 11:
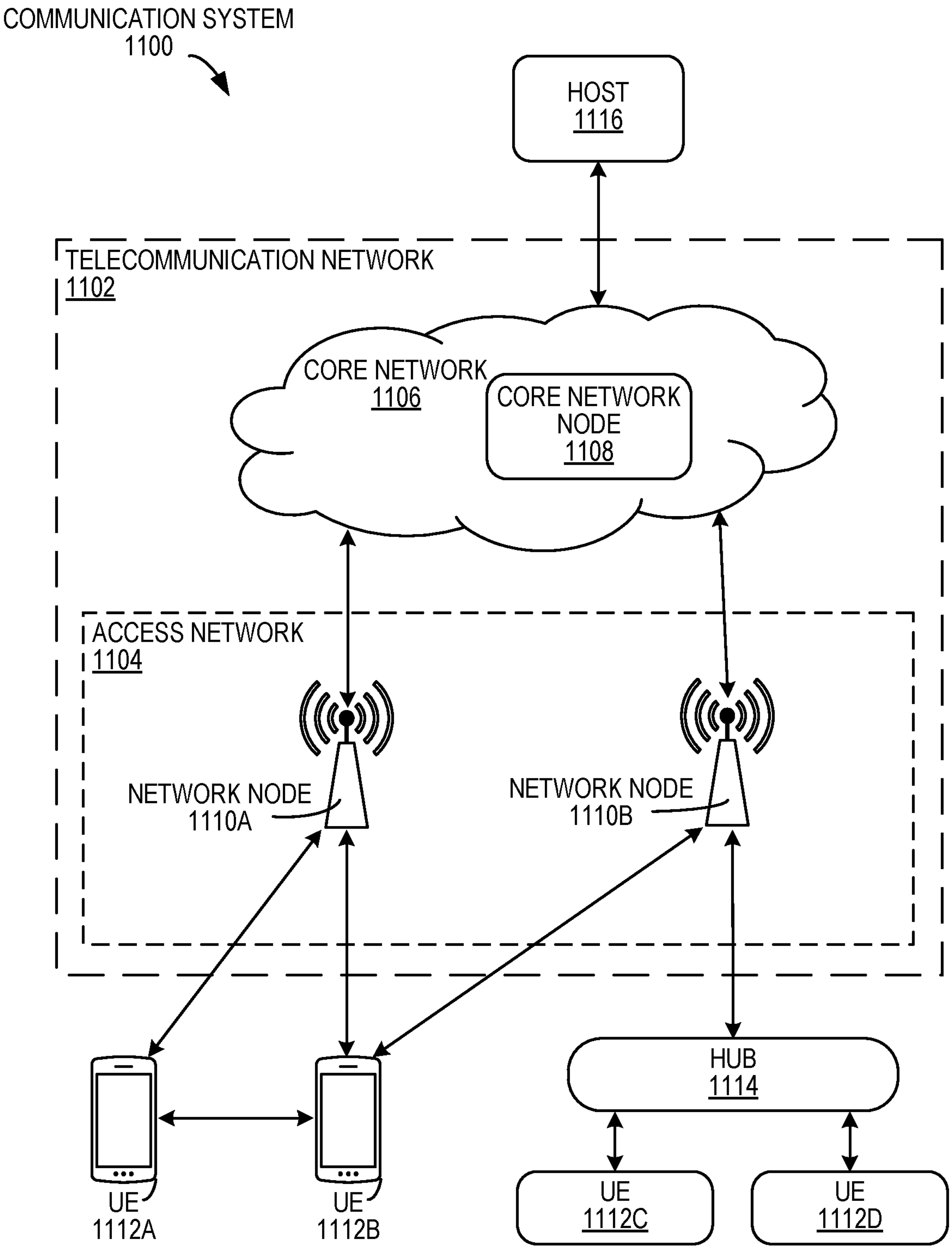
FIG. 11 shows an example of a communication system in accordance with some embodiments.

FIG. 11 shows an example of a communication system 1100 in accordance with some embodiments.

In the example, the communication system 1100 includes a telecommunication network 1102 that includes an access network 1104, such as a Radio Access Network (RAN), and a core network 1106, which includes one or more core network nodes 1108. The access network 1104 includes one or more access network nodes, such as network nodes 1110A and 1110B (one or more of which may be generally referred to as network nodes 1110), or any other similar Third Generation Partnership Project (3GPP) access node or non-3GPP Access Point (AP). The network nodes 1110 facilitate direct or indirect connection of User Equipment (UE), such as by connecting UEs 1112A, 1112B, 1112C, and 1112D (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-Concealing Function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system 1100 may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable Second, Third, Fourth, or Fifth Generation (2G, 3G, 4G, or 5G) standards, or any applicable future generation standard (e.g., Sixth Generation (6G)); Wireless Local Area Network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any Low Power Wide Area Network (LPWAN) standards such as LoRa and Sigfox.

In some examples, the telecommunication network 1102 is a cellular network that implements 3GPP standardized features. Accordingly, the telecommunication network 1102 may support network slicing to provide different logical networks to different devices that are connected to the telecommunication network 1102. For example, the telecommunication network 1102 may provide Ultra Reliable Low Latency Communication (URLLC) services to some UEs, while providing enhanced Mobile Broadband (eMBB) services to other UEs, and/or massive Machine Type Communication (mMTC)/massive Internet of Things (IoT) services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-Radio Access Technology (RAT) or multi-standard mode. For example, a UE may operate with any one or combination of WiFi, New Radio (NR), and LTE, i.e. be configured for Multi-Radio Dual Connectivity (MR-DC), such as Evolved UMTS Terrestrial RAN (E-UTRAN) NR-Dual Connectivity (EN-DC).

In the example, a hub 1114 communicates with the access network 1104 to facilitate indirect communication between one or more UEs (e.g., UE 1112C and/or 1112D) and network nodes (e.g., network node 1110B). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a Virtual Reality (VR) headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110B. The hub 1114 may also allow for a different communication scheme and/or schedule between the hub 1114 and UEs (e.g., UE 1112C and/or 1112D), and between the hub 1114 and the core network 1106. In other examples, the hub 1114 is connected to the core network 1106 and/or one or more UEs via a wired connection. Moreover, the hub 1114 may be configured to connect to a Machine-to-Machine (M2M) service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110B. In other embodiments, the hub 1114 may be a non-dedicated hub—that is, a device which is capable of operating to route communications between the UEs and the network node 1110B, but which is additionally capable of operating as a communication start and/or end point for certain data channels.

Figure 12:
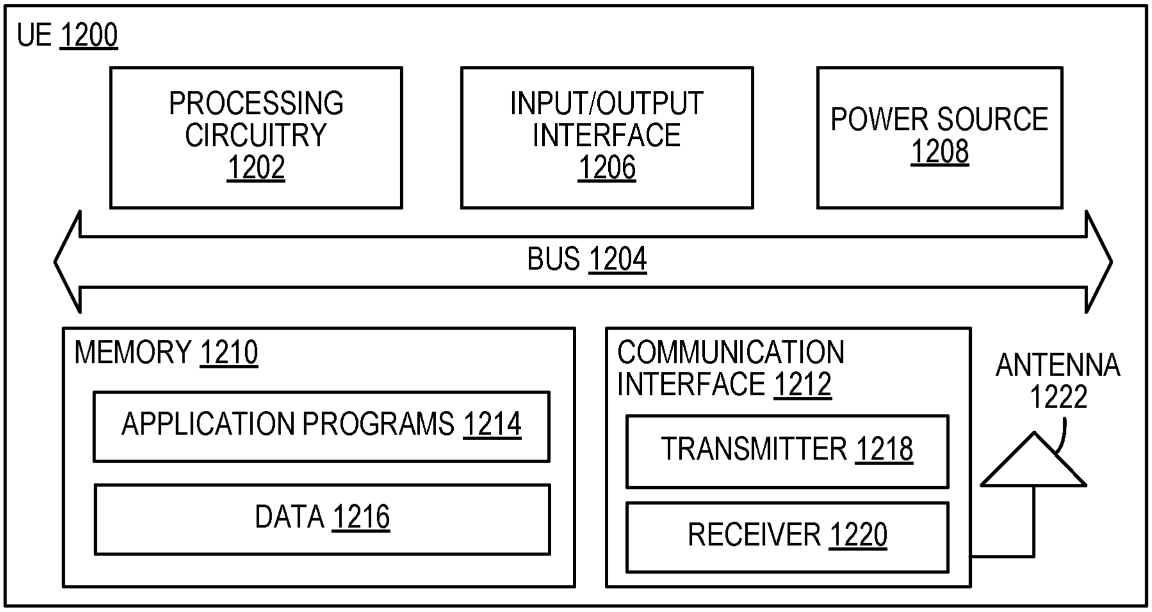
FIG. 12 shows a UE in accordance with some embodiments.

FIG. 12 shows a UE 1200 in accordance with some embodiments. As used herein, a UE refers to a device capable, configured, arranged, and/or operable to communicate wirelessly with network nodes and/or other UEs. Examples of a UE include, but are not limited to, a smart phone, mobile phone, cell phone, Voice over Internet Protocol (VoIP) phone, wireless local loop phone, desktop computer, Personal Digital Assistant (PDA), wireless camera, gaming console or device, music storage device, playback appliance, wearable terminal device, wireless endpoint, mobile station, tablet, laptop, Laptop Embedded Equipment (LEE), Laptop Mounted Equipment (LME), smart device, wireless Customer Premise Equipment (CPE), vehicle-mounted or vehicle embedded/integrated wireless device, etc. Other examples include any UE identified by the 3GPP, including a Narrowband Internet of Things (NB-IoT) UE, a Machine Type Communication (MTC) UE, and/or an enhanced MTC (eMTC) UE.

A UE may support Device-to-Device (D2D) communication, for example by implementing a 3GPP standard for sidelink communication, Dedicated Short-Range Communication (DSRC), Vehicle-to-Vehicle (V2V), Vehicle-to-Infrastructure (V2I), or Vehicle-to-Everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, Field Programmable Gate Arrays (FPGAs), Application Specific Integrated Circuits (ASICs), etc.); programmable logic together with appropriate firmware; one or more stored computer programs, general purpose processors, such as a microprocessor or Digital Signal Processor (DSP), together with appropriate software; or any combination of the above. For example, the processing circuitry 1202 may include multiple Central Processing Units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the ULE 1200 via input circuitry or an interface such as an electrical power cable. Delivering power may be, for example, for charging the power source 1208. Power circuitry may perform any formatting, converting, or other modification to the power from the power source 1208 to make the power suitable for the respective components of the UE 1200 to which power is supplied.

The memory 1210 may be or be configured to include memory such as Random Access Memory (RAM), Read Only Memory (ROM), Programmable ROM (PROM), Erasable PROM (EPROM), Electrically EPROM (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as Redundant Array of Independent Disks (RAID), flash memory, USB flash drive, external hard disk drive, thumb drive, pen drive, key drive, High Density Digital Versatile Disc (HD-DVD) optical disc drive, internal hard disk drive, Blu-Ray optical disc drive, Holographic Digital Data Storage (HDDS) optical disc drive, external mini Dual In-line Memory Module (DIMM), Synchronous Dynamic RAM (SDRAM), external micro-DIMM SDRAM, smartcard memory such as a tamper resistant module in the form of a Universal Integrated Circuit Card (UICC) including one or more Subscriber Identity Modules (SIMs), such as a Universal SIM (USIM) and/or Internet Protocol Multimedia Services Identity Module (ISIM), other memory, or any combination thereof. The UICC may for example be an embedded UICC (eUICC), integrated UICC (iUICC) or a removable UICC commonly known as a 'SIM card.' The memory 1210 may allow the UE 1200 to access instructions, application programs, and the like stored on transitory or non-transitory memory media, to off-load data, or to upload data. An article of manufacture, such as one utilizing a communication system, may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., the antenna 1222) and may share circuit components, software, or firmware, or alternatively be implemented separately.

In the illustrated embodiment, communication functions of the communication interface 1212 may include cellular communication, WiFi communication, LPWAN communication, data communication, voice communication, multimedia communication, short-range communications such as Bluetooth, NFC, location-based communication such as the use of the Global Positioning System (GPS) to determine a location, another like communication function, or any combination thereof. Communications may be implemented according to one or more communication protocols and/or standards, such as IEEE 802.11, Code Division Multiplexing Access (CDMA), Wideband CDMA (WCDMA), GSM, LTE, NR, UMTS, WiMax, Ethernet, Transmission Control Protocol/Internet Protocol (TCP/IP), Synchronous Optical Networking (SONET), Asynchronous Transfer Mode (ATM), Quick User Datagram Protocol Internet Connection (QUIC), Hypertext Transfer Protocol (HTTP), and so forth.

Regardless of the type of sensor, a UE may provide an output of data captured by its sensors, through its communication interface 1212, or via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application, and healthcare. Non-limiting examples of such an IoT device are a device which is or which is embedded in: a connected refrigerator or freezer, a television, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or VR, a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship, an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator and handle communication of data for both the speed sensor and the actuators.

Figure 13:
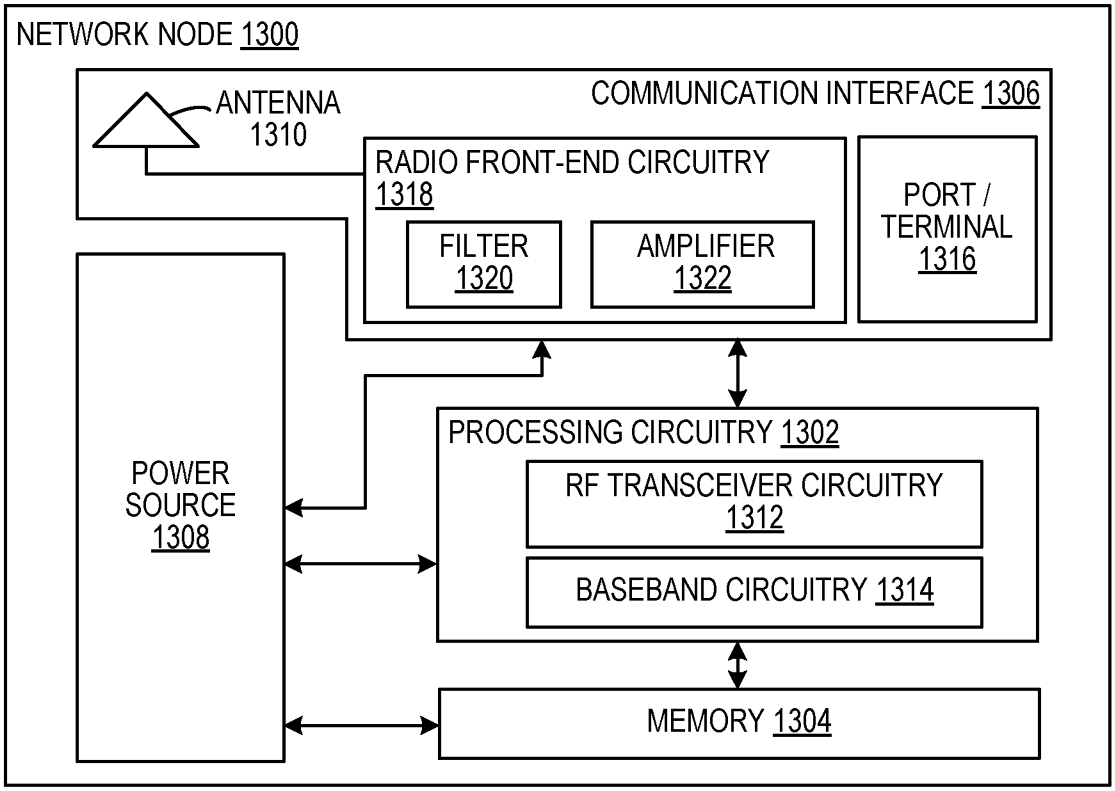
FIG. 13 shows a network node in accordance with some embodiments.

FIG. 13 shows a network node 1300 in accordance with some embodiments. As used herein, network node refers to equipment capable, configured, arranged, and/or operable to communicate directly or indirectly with a UE and/or with other network nodes or equipment in a telecommunication network. Examples of network nodes include, but are not limited to, APs (e.g., radio APs), Base Stations (BSs) (e.g., radio BSs, Node Bs, evolved Node Bs (eNBs), and NR Node Bs (gNBs)).

BSs may be categorized based on the amount of coverage they provide (or, stated differently, their transmit power level) and so, depending on the provided amount of coverage, may be referred to as femto BSs, pico BSs, micro BSs, or macro BSs. A BS may be a relay node or a relay donor node controlling a relay. A network node may also include one or more (or all) parts of a distributed radio BS such as centralized digital units and/or Remote Radio Units (RRUs), sometimes referred to as Remote Radio Heads (RRHs). Such RRUs may or may not be integrated with an antenna as an antenna integrated radio. Parts of a distributed radio BS may also be referred to as nodes in a Distributed Antenna System (DAS).

Other examples of network nodes include multiple Transmission Point (multi-TRP) 5G access nodes, Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes processing circuitry 1302, memory 1304, a communication interface 1306, and a power source 1308. The network node 1300 may be composed of multiple physically separate components (e.g., a Node B component and an RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1300 may be configured to support multiple RATs. In such embodiments, some components may be duplicated (e.g., separate memory 1304 for different RATs) and some components may be reused (e.g., an antenna 1310 may be shared by different RATs). The network node 1300 may also include multiple sets of the various illustrated components for different wireless technologies integrated into network node 1300, for example GSM, WCDMA, LTE, $N_R$, WiFi, Zigbee, Z-wave, Long Range Wide Area Network (LoRaWAN), Radio Frequency Identification (RFID), or Bluetooth wireless technologies. These wireless technologies may be integrated into the same or different chip or set of chips and other components within the network node 1300.

The processing circuitry 1302 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other network node 1300 components, such as the memory 1304, to provide network node 1300 functionality.

In some embodiments, the processing circuitry 1302 includes a System on a Chip (SOC). In some embodiments, the processing circuitry 1302 includes one or more of Radio Frequency (RF) transceiver circuitry 1312 and baseband processing circuitry 1314. In some embodiments, the RF transceiver circuitry 1312 and the baseband processing circuitry 1314 may be on separate chips (or sets of chips), boards, or units, such as radio units and digital units. In alternative embodiments, part or all of the RF transceiver circuitry 1312 and the baseband processing circuitry 1314 may be on the same chip or set of chips, boards, or units.

The memory 1304 may comprise any form of volatile or non-volatile computer-readable memory including, without limitation, persistent storage, solid state memory, remotely mounted memory, magnetic media, optical media, RAM, ROM, mass storage media (for example, a hard disk), removable storage media (for example, a flash drive, a Compact Disk (CD), or a Digital Video Disk (DVD)), and/or any other volatile or non-volatile, non-transitory device-readable, and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and the memory 1304 are integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. The radio front-end circuitry 1318 comprises filters 1320 and amplifiers 1322. The radio front-end circuitry 1318 may be connected to the antenna 1310 and the processing circuitry 1302. The radio front-end circuitry 1318 may be configured to condition signals communicated between the antenna 1310 and the processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of the filters 1320 and/or the amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface 1306 may comprise different components and/or different combinations of components.

In certain alternative embodiments, the network node 1300 does not include separate radio front-end circuitry 1318; instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes the one or more ports or terminals 1316, the radio front-end circuitry 1318, and the RF transceiver circuitry 1312 as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, the communication interface 1306, and/or the processing circuitry 1302 may be configured to perform any receiving operations and/or certain obtaining operations described herein as being performed by the network node 1300. Any information, data, and/or signals may be received from a UE, another network node, and/or any other network equipment. Similarly, the antenna 1310, the communication interface 1306, and/or the processing circuitry 1302 may be configured to perform any transmitting operations described herein as being performed by the network node 1300. Any information, data, and/or signals may be transmitted to a UE, another network node, and/or any other network equipment.

The power source 1308 provides power to the various components of the network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid or an electricity outlet) via input circuitry or an interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
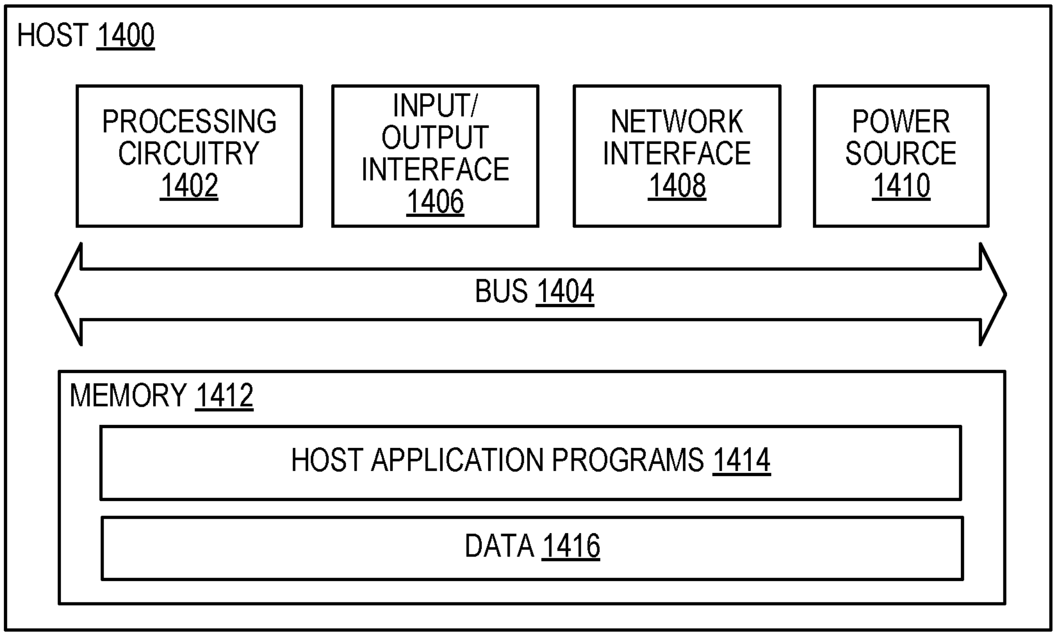
FIG. 14 is a block diagram of a host, which may be an embodiment of the host of FIG. 11, in accordance with various aspects described herein.

FIG. 14 is a block diagram of a host 1400, which may be an embodiment of the host 1116 of FIG. 11, in accordance with various aspects described herein. As used herein, the host 1400 may be or comprise various combinations of hardware and/or software including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and memory 1412. Other components may be included in other embodiments. Features of these components may be substantially similar to those described with respect to the devices of previous figures, such as FIGS. 12 and 13, such that the descriptions thereof are generally applicable to the corresponding components of the host 1400.

The memory 1412 may include one or more computer programs including one or more host application programs 1414 and data 1416, which may include user data, e.g. data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), Moving Picture Experts Group (MPEG), VP9) and audio codecs (e.g., Free Lossless Audio Codec (FLAC), Advanced Audio Coding (AAC), MPEG, G.711), including transcoding for multiple different classes, types, or implementations of UEs (e.g., handsets, desktop computers, wearable display systems, and heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for Over-The-Top (OTT) services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (DASH or MPEG-DASH), etc.

Figure 15:
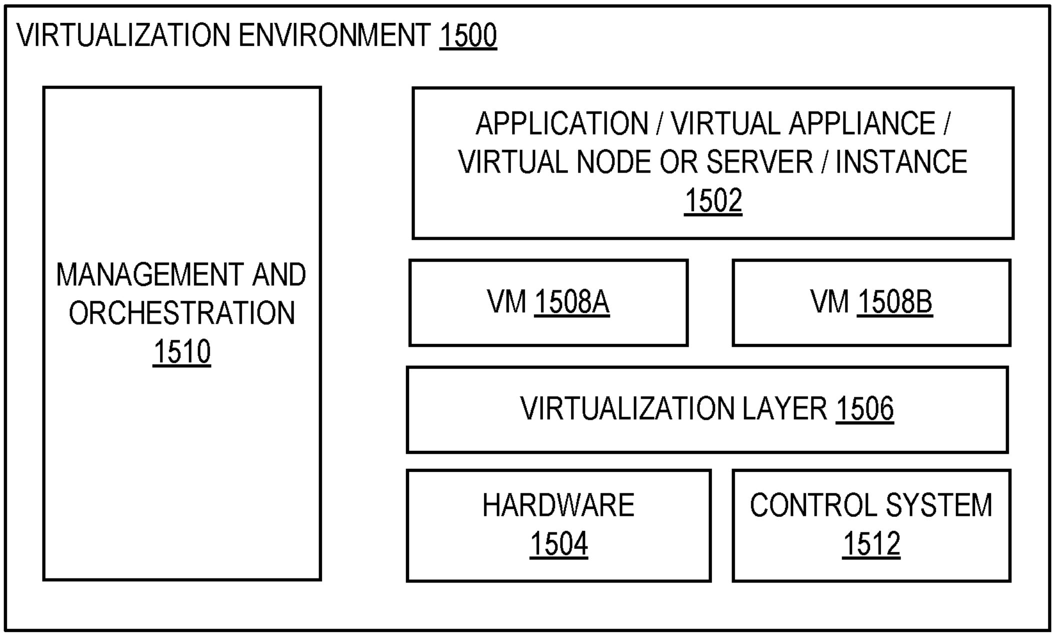
FIG. 15 is a block diagram illustrating a virtualization environment in which functions implemented by some embodiments may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices, and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more Virtual Machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment 1400 to implement some of the features, functions, and/or benefits of some of the embodiments disclosed herein.

Hardware 1504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1506 (also referred to as hypervisors or VM Monitors (VMMs)), provide VMs 1508A and 1508B (one or more of which may be generally referred to as VMs 1508), and/or perform any of the functions, features, and/or benefits described in relation with some embodiments described herein. The virtualization layer 1506 may present a virtual operating platform that appears like networking hardware to the VMs 1508.

The VMs 1508 comprise virtual processing, virtual memory, virtual networking, or interface and virtual storage, and may be run by a corresponding virtualization layer 1506. Different embodiments of the instance of a virtual appliance 1502 may be implemented on one or more of the VMs 1508, and the implementations may be made in different ways. Virtualization of the hardware is in some contexts referred to as Network Function Virtualization (NFV). NFV may be used to consolidate many network equipment types onto industry standard high volume server hardware, physical switches, and physical storage, which can be located in data centers and customer premise equipment.

In the context of NFV, a VM 1508 may be a software implementation of a physical machine that runs programs as if they were executing on a physical, non-virtualized machine. Each of the VMs 1508, and that part of the hardware 1504 that executes that VM, be it hardware dedicated to that VM and/or hardware shared by that VM with others of the VMs 1508, forms separate virtual network elements. Still in the context of NFV, a virtual network function is responsible for handling specific network functions that run in one or more VMs 1508 on top of the hardware 1504 and corresponds to the application 1502.

The hardware 1504 may be implemented in a standalone network node with generic or specific components. The hardware 1504 may implement some functions via virtualization. Alternatively, the hardware 1504 may be part of a larger cluster of hardware (e.g., such as in a data center or CPE) where many hardware nodes work together and are managed via management and orchestration 1510, which, among others, oversees lifecycle management of the applications 1502. In some embodiments, the hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a RAN or a BS. In some embodiments, some signaling can be provided with the use of a control system 1512 which may alternatively be used for communication between hardware nodes and radio units.

Figure 16:
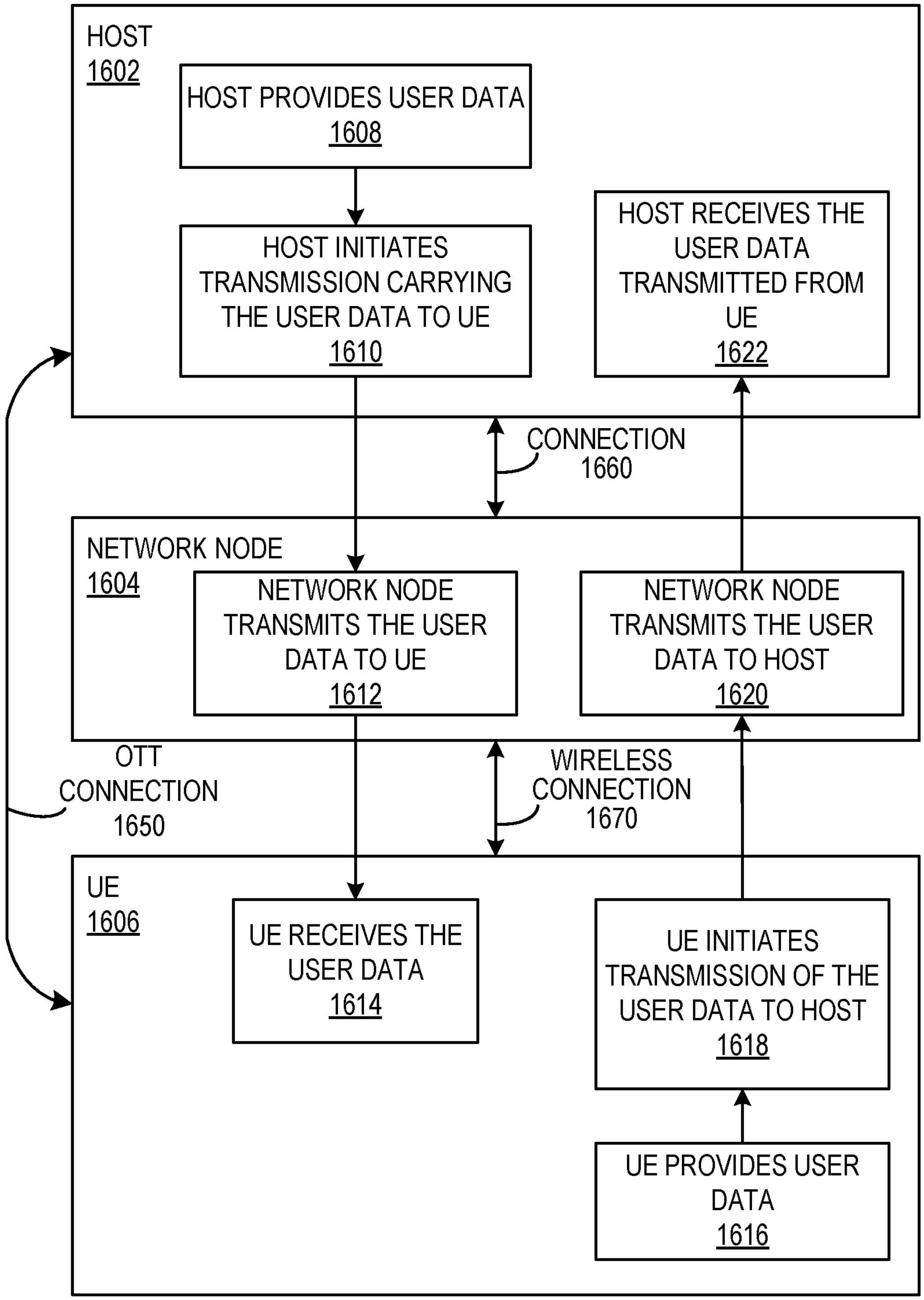
FIG. 16 shows a communication diagram of a host communicating via a network node with a UE over a partially wireless connection in accordance with some embodiments.

FIG. 16 shows a communication diagram of a host 1602 communicating via a network node 1604 with a UE 1606 over a partially wireless connection in accordance with some embodiments. Example implementations, in accordance with various embodiments, of the UE (such as the UE 1112A of FIG. 11 and/or the UE 1200 of FIG. 12), the network node (such as the network node 1110A of FIG. 11 and/or the network node 1300 of FIG. 13), and the host (such as the host 1116 of FIG. 11 and/or the host 1400 of FIG. 14) discussed in the preceding paragraphs will now be described with reference to FIG. 16.

Like the host 1400, embodiments of the host 1602 include hardware, such as a communication interface, processing circuitry, and memory. The host 1602 also includes software, which is stored in or is accessible by the host 1602 and executable by the processing circuitry. The software includes a host application that may be operable to provide a service to a remote user, such as the UE 1606 connecting via an OTT connection 1650 extending between the UE 1606 and the host 1602. In providing the service to the remote user, a host application may provide user data which is transmitted using the OTT connection 1650.

The network node 1604 includes hardware enabling it to communicate with the host 1602 and the UE 1606 via a connection 1660. The connection 1660 may be direct or pass through a core network (like the core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by the UE 1606 and executable by the UE's processing circuitry. The software includes a client application, such as a web browser or operator-specific "app" that may be operable to provide a service to a human or non-human user via the UE 1606 with the support of the host 1602. In the host 1602, an executing host application may communicate with the executing client application via the OTT connection 1650 terminating at the UE 1606 and the host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via the connection 1660 between the host 1602 and the network node 1604 and via a wireless connection 1670 between the network node 1604 and the UE 1606 to provide the connection between the host 1602 and the UE 1606. The connection 1660 and the wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604 in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1606 using the OTT connection 1650, in which the wireless connection 1670 forms the last segment.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR, or AR which it can broadcast, multicast, or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing, and/or transmitting data.

In some examples, a measurement procedure may be provided for the purpose of monitoring data rate, latency, and other factors on which the one or more embodiments improve. There may further be an optional network functionality for reconfiguring the OTT connection 1650 between the host 1602 and the UE 1606 in response to variations in the measurement results. The measurement procedure and/or the network functionality for reconfiguring the OTT connection 1650 may be implemented in software and hardware of the host 1602 and/or the UE 1606. In some embodiments, sensors (not shown) may be deployed in or in association with other devices through which the OTT connection 1650 passes; the sensors may participate in the measurement procedure by supplying values of the monitored quantities exemplified above, or by supplying values of other physical quantities from which software may compute or estimate the monitored quantities. The reconfiguring of the OTT connection 1650 may include message format, retransmission settings, preferred routing, etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency, and the like by the host 1602. The measurements may be implemented in that software causes messages to be transmitted, in particular empty or 'dummy' messages, using the OTT connection 1650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining, or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box or nested within multiple boxes, in practice computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hardwired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole and/or by end users and a wireless network generally.

Some example embodiments of the present disclosure are as follows:

Group A Embodiments

Embodiment 1: A method performed by a User Equipment, UE, (600), the method comprising:

generating (604) Channel State Information, CSI, comprising:

non-zero coefficients, NZCs, of a plurality of linear combining coefficient matrices ($\tilde{W}_2$s) for a plurality of time instances (e.g., slots), respectively; and at least one NZC bitmap that indicates positions of the NZCs in the plurality of $\tilde{W}_2$s for the plurality of time instances, the at least one NZC bitmap comprising either:

a common NZC bitmap for all of the plurality of time instances per each reported layer; or a common NZC bitmap for all of the plurality of times for all reported layers; or a first common NZC bitmap for all of the plurality of time instances for a first set of reported layers and separate NZC bitmaps for all of the plurality of time instances for a second set of report layers; or two or more common NZC bitmaps for two or more sets of reported layers, respectively; and reporting (606) the CSI to a network node (602).

Embodiment 2: The method of embodiment 1 wherein generating the at least one NZC bitmap comprises generating at least one common NZC bitmap for all of the plurality of time instances based on only one of the plurality of $\tilde{W}_2$s for the plurality of time instances.

Embodiment 3: The method of embodiment 1 wherein generating the at least one NZC bitmap comprises generating at least one common NZC bitmap for all of the plurality of time instances based on only a subset of the plurality of $\tilde{W}_2$s for the plurality of time instances.

Embodiment 4: The method of any of embodiments 1 to 3 wherein the CSI further comprises, for each of the reported layers, a single strongest coefficient indicator that indicates a position of a strongest coefficient for all of the plurality of linear combining coefficient matrices ($\tilde{W}_2$s) for the plurality of time instances for that layer.

Embodiment 5: The method of any of embodiments 1 to 3 wherein:

for each reported layer, the elements of each of the plurality of linear combining coefficient matrices ($\tilde{W}_2$s) for the plurality of time instances are normalized with respect to a strongest coefficient of that layer such that, after normalization, strongest coefficient has unit amplitude and zero phase and, as such, is not reported; and the CSI further comprises, for each of the reported layers, a single strongest coefficient indicator that indicates a position of the strongest coefficient for all of the plurality of linear combining coefficient matrices ($\tilde{W}_2$s) for the plurality of time instances for that layer.

Embodiment 6: A method performed by a User Equipment, UE, (600), the method comprising:

generating (604) Channel State Information, CSI, comprising:

a non-zero coefficients, NZCs, of a compressed linear combining coefficient matrix ($\tilde{W}_2$), wherein:

the compressed linear combining coefficient matrix ($\tilde{W}_2$) is a compressed representation of a plurality of linear combining coefficient matrices for a plurality of time instances; and compression is achieved via a Discrete Fourier Transform, DFT, matrix, $\tilde{W}_d$, that compresses the channel in Doppler domain; and the compressed linear combining coefficient matrix ($\tilde{W}_2$) comprises a set of $$M_v^{DD}$$

DD/Tb basis vectors; and for each reported layer, a set of $$M_v^{DD}$$

NZC bitmaps that indicates positions of the NZCs in respective DD/TD basis vectors the compressed linear combining coefficient matrix ($\tilde{W}_2$); and reporting (606) the CSI to a network node (602).

Embodiment 7: The method of embodiment 6 wherein a maximum number of NZCs per layer is determined, configured, or defined per DD/TD basis vector.

Embodiment 8: The method of embodiment 6 wherein a maximum number of NZCs per layer is determined, configured, or defined by a total number of NZCs for all DD/TD basis vectors.

Embodiment 9: The method of any of embodiments 6 to 8 wherein the CSI further comprises, for each of the reported layers, a single strongest coefficient indicator that indicates a position of a strongest coefficient for that layer.

Embodiment 10: The method of embodiment 9 wherein the single strongest coefficient indicator is associated with any selected SD basis, FD basis, and TD or DD basis that are reported together with the NZCs of the compressed linear combining coefficient matrix ($\tilde{W}_2$).

Embodiment 11: The method of embodiment 9 wherein the single strongest coefficient indicator is associated with any selected SD basis and TD or DD basis that are reported together with the NZCs of the compressed linear combining coefficient matrix ($\tilde{W}_2$), and is associated with a DC component of FD basis.

Embodiment 12: The method of embodiment 9 wherein the single strongest coefficient indicator is associated with any selected SD basis and FD basis that are reported together with the NZCs of the compressed linear combining coefficient matrix ($\tilde{W}_2$), and is associated with a DC component of TD or DD basis.

Embodiment 13: The method of embodiment 9 wherein the single strongest coefficient indicator is associated with any selected SD basis that is reported together with the NZCs of the compressed linear combining coefficient matrix ($\tilde{W}_2$), and is associated with a DC component of FD basis as well as a DC component of TD or DD basis.

Embodiment 14: The method of any of embodiments 1 to 13 wherein the reported CSI is in accordance with any of the embodiments described in Section 3 of the "Additional Explanation" above.

Embodiment 15: The method of any of the previous embodiments, wherein each of the plurality of linear combination coefficient matrices is represented by a set of amplitude coefficient indicators and a set of phase coefficient indicators.

Embodiment 16: The method of any of the previous embodiments, further comprising: providing user data; and forwarding the user data to a host via the transmission to the network node.

Group B Embodiments

Embodiment 17: A method performed by a network node (602), the method comprising: receiving (606) a Channel State Information, CSI, report comprising the CSI of any of embodiments 1 to 14; and performing (608) one or more operational tasks based on the CSI.

Embodiment 18: The method of any of the previous embodiments, further comprising: obtaining user data; and forwarding the user data to a host or a user equipment.

Group C Embodiments

Embodiment 19: A user equipment comprising: processing circuitry configured to perform any of the steps of any of the Group A embodiments; and power supply circuitry configured to supply power to the processing circuitry.

Embodiment 20: A network node comprising: processing circuitry configured to perform any of the steps of any of the Group B embodiments; and power supply circuitry configured to supply power to the processing circuitry.

Embodiment 21: A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 22: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

Embodiment 23: The host of the previous embodiment, wherein the cellular network further includes a network node configured to communicate with the UE to transmit the user data to the UE from the host.

Embodiment 24: The host of the previous 2 embodiments, wherein: the processing circuitry of the host is configured to execute a host application, thereby providing the user data; and the host application is configured to interact with a client application executing on the UE, the client application being associated with the host application.

Embodiment 25: A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A embodiments to receive the user data from the host.

Embodiment 26: The method of the previous embodiment, further comprising: at the host, executing a host application associated with a client application executing on the UE to receive the user data from the UE.

Embodiment 27: The method of the previous embodiment, further comprising: at the host, transmitting input data to the client application executing on the UE, the input data being provided by executing the host application, wherein the user data is provided by the client application in response to the input data from the host application.

Embodiment 28: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

Embodiment 29: The host of the previous embodiment, wherein the cellular network further includes a network node configured to communicate with the UE to transmit the user data from the UE to the host.

Embodiment 30: The host of the previous 2 embodiments, wherein: the processing circuitry of the host is configured to execute a host application, thereby providing the user data; and the host application is configured to interact with a client application executing on the UE, the client application being associated with the host application.

Embodiment 31: A method implemented by a host configured to operate in a communication system that further includes a network node and a user equipment (UE), the method comprising: at the host, receiving user data transmitted to the host via the network node by the UE, wherein the UE performs any of the steps of any of the Group A embodiments to transmit the user data to the host.

Embodiment 32: The method of the previous embodiment, further comprising: at the host, executing a host application associated with a client application executing on the UE to receive the user data from the UE.

Embodiment 33: The method of the previous embodiment, further comprising: at the host, transmitting input data to the client application executing on the UE, the input data being provided by executing the host application, wherein the user data is provided by the client application in response to the input data from the host application.

Embodiment 34: A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

Embodiment 35: The host of the previous embodiment, wherein: the processing circuitry of the host is configured to execute a host application that provides the user data; and the UE comprises processing circuitry configured to execute a client application associated with the host application to receive the transmission of user data from the host.

Embodiment 36: A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B embodiments to transmit the user data from the host to the UE.

Embodiment 37: The method of the previous embodiment, further comprising, at the network node, transmitting the user data provided by the host for the UE.

Embodiment 38: The method of any of the previous 2 embodiments, wherein the user data is provided at the host by executing a host application that interacts with a client application executing on the UE, the client application being associated with the host application.

Embodiment 39: A communication system configured to provide an over-the-top service, the communication system comprising a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

Embodiment 40: The communication system of the previous embodiment, further comprising: the network node; and/or the user equipment.

Embodiment 41: A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

Embodiment 42: The host of the previous 2 embodiments, wherein: the processing circuitry of the host is configured to execute a host application, thereby providing the user data; and the host application is configured to interact with a client application executing on the UE, the client application being associated with the host application.

Embodiment 43: The host of the any of the previous 2 embodiments, wherein the initiating receipt of the user data comprises requesting the user data.

Embodiment 44: A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B embodiments to receive the user data from the UE for the host.

Embodiment 45: The method of the previous embodiment, further comprising at the network node, transmitting the received user data to the host.

Those skilled in the art will recognize improvements and modifications to the embodiments of the present disclosure. All such improvements and modifications are considered within the scope of the concepts disclosed herein.

The invention claimed is:

1. A method performed by a User Equipment (UE), the method comprising:

generating Channel State Information (CSI) comprising:

non-zero coefficients (NZCs) of a set of linear combining coefficients, wherein the set of linear combining coefficients are associated with:

a number (L) of selected Discrete Fourier Transform (DFT) basis vectors in spatial domain (SD);

a number (M) of selected DFT basis vectors in frequency domain (FD); and a number, $$(M_v^{DD})$$

of selected DFT basis vectors in Doppler Domain (DD), where the number $$(M_v^{DD})$$

is two or more; and for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD; and reporting the CSI to a network node.

2. The method of claim 1, wherein each NZC bitmap of the set of $$M_v^{DD}$$

NZC bitmaps has a size of 2 LM bits.

3. The method of claim 1, wherein a maximum number of NZCs per layer is determined, configured, or defined by a total number of NZCs for all $$M_v^{DD}$$

selected DFT basis vectors in DD.

4. The method of claim 1, wherein a maximum number of NZCs per layer is determined, configured, or defined per selected DFT basis vector in DD.

5. The method of claim 1, wherein the CSI further comprises, for each reported layer, a single strongest coefficient indicator that indicates a position of a strongest coefficient for that layer.

6. The method of claim 5, wherein the single strongest coefficient indicator is associated with any selected DFT basis vector in SD, DFT basis vector in FD, and DFT basis vector in DD that are reported together with the NZCs of the set of linear combining coefficients.

7. The method of claim 5, wherein the single strongest coefficient indicator is associated with any selected DFT basis vector in SD and DFT basis vector in DD that are reported together with the NZCs of the set of linear combining coefficients, and is associated with a DC component of DFT basis vector in FD.

8. The method of claim 5, wherein the single strongest coefficient indicator is associated with any selected DFT basis vector in SD and DFT basis vector in FD that are reported together with the NZCs of the set of linear combining coefficients, and is associated with a DC component of DFT basis vector in DD.

9. The method of claim 5, wherein the single strongest coefficient indicator is associated with any selected DFT basis vector in SD that is reported together with the NZCs of the set of linear combining coefficients, and is associated with a DC component of the DFT basis vector in FD as well as a DC component of the DFT basis vector in DD.

10. The method of claim 1, wherein the CSI further comprises an indication of the selected DFT basis vectors in DD.

11. The method of claim 1, wherein each of the set of linear combination coefficients is represented by a set of amplitude coefficient indicators and a set of phase coefficient indicators.

12. A User Equipment (UE), comprising:

a communication interface; and processing circuitry associated with the communication interface, the processing circuitry configured to cause the UE to:

generate Channel State Information (CSI) comprising:

a non-zero coefficients (NZCs) of a set of linear combining coefficients, wherein the set of linear combination coefficients are associated with:

a number (L) of selected Discrete Fourier Transform (DFT) basis vectors in spatial domain (SD);

a number (M) of selected DFT basis vectors in frequency domain (FD); and a number, $$(M_v^{DD})$$

of selected DFT basis vectors in Doppler Domain (DD), where the number $$(M_v^{DD})$$

is two or more; and for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD; and report the CSI to a network node.

13. A method performed by a network node, the method comprising:

receiving a Channel State Information (CSI) report comprising CSI, the CSI comprising:

non-zero coefficients (NZCs) of a set of linear combining coefficients, wherein the set of linear combining coefficients are associated with:

a number (L) of selected Discrete Fourier Transform (DFT) basis vectors in spatial domain (SD);

a number (M) of selected DFT basis vectors in frequency domain (FD); and a number, $$(M_v^{DD})$$

of selected DFT basis vectors in Doppler Domain (DD), where the number $$(M_v^{DD})$$

is two or more; and for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD; and performing one or more operational tasks based on the CSI.

14. A network node comprising processing circuitry configured to cause the network node to:

receive a Channel State Information (CSI) report comprising CSI, the CSI comprising:

non-zero coefficients (NZCs) of a set of linear combining coefficients, wherein the set of linear combining coefficients are associated with:

a number (L) of selected Discrete Fourier Transform (DFT) basis vectors in spatial domain (SD);

a number (M) of selected DFT basis vectors in frequency domain (FD); and a number, $$(M_v^{DD})$$

of selected DFT basis vectors in Doppler Domain (DD), where the number $$(M_v^{DD})$$

is two or more, and for each reported layer, a set of $$M_v^{DD}$$

NZC bitmaps that indicates positions of the NZCs, wherein the set of $$M_v^{DD}$$

NZC bitmaps comprises a separate bitmap for each selected DFT basis vector in DD in the set of $$M_v^{DD}$$

selected DFT basis vectors in DD; and perform one or more operational tasks based on the CSI.

* * * * *